US008280602B2

(12) United States Patent
Uechi et al.

(10) Patent No.: US 8,280,602 B2
(45) Date of Patent: Oct. 2, 2012

(54) OPERATION ASSIST APPARATUS

(75) Inventors: Masaaki Uechi, Hadano (JP); Kazuya Sasaki, Susono (JP); Masumi Kobana, Fuji (JP); Hirokazu Nishitani, Kashihara (JP); Hiroaki Kosaka, Ikoma (JP)

(73) Assignees: Toyota Jidosha Kabushiki Kaisha, Toyota-shi (JP); National University Corporation Nara Institute of Science and Technology, Ikoma-shi (JP)

(*) Notice: Subject to any disclaimer, the term of this patent is extended or adjusted under 35 U.S.C. 154(b) by 348 days.

(21) Appl. No.: 12/297,646

(22) PCT Filed: Aug. 1, 2007

(86) PCT No.: PCT/IB2007/002218

§ 371 (c)(1), (2), (4) Date: Oct. 20, 2008

(87) PCT Pub. No.: WO2008/015551

PCT Pub. Date: Feb. 7, 2008

(65) Prior Publication Data

US 2009/0069994 A1 Mar. 12, 2009

(30) Foreign Application Priority Data

Aug. 3, 2006 (JP) ................................ 2006-212167

(51) Int. Cl.
*B60K 28/02* (2006.01)

(52) U.S. Cl. ......................................... 701/70; 340/429

(58) Field of Classification Search .................... 701/41, 701/70, 36; 340/522, 439, 435, 576
See application file for complete search history.

(56) References Cited

U.S. PATENT DOCUMENTS

| | | | | |
|---|---|---|---|---|
| 5,521,580 | A | 5/1996 | Kaneko et al. | |
| 5,529,139 | A * | 6/1996 | Kurahashi et al. | 180/169 |
| 6,449,572 | B1 | 9/2002 | Kurz et al. | |
| 7,205,888 | B2 * | 4/2007 | Isaji et al. | 340/522 |
| 7,715,972 | B2 * | 5/2010 | Kuge | 701/96 |

(Continued)

FOREIGN PATENT DOCUMENTS

EP 1 182 089 2/2002

(Continued)

OTHER PUBLICATIONS

Japanese Office Action mailed on Nov. 8, 2011, issued for JP Application No. 2006-212167, filed on Aug. 3, 2006 (with English translation).

(Continued)

*Primary Examiner* — Thomas Black
*Assistant Examiner* — Marthe Marc-Coleman
(74) *Attorney, Agent, or Firm* — Oblon, Spivak, McClelland, Maier & Neustadt, L.L.P.

(57) ABSTRACT

An operation assist apparatus including: an assist controller that assists a driver of a vehicle in operating the vehicle before a stop point; and a watching action detector that detects a watching action of the driver for watching the stop point. The assist controller changes an assist manner in which to assist the vehicle operation by the driver in accordance with whether the watching action is detected by the watching action detector during deceleration of the vehicle. Thus configured, the operation assist apparatus can accurately determine whether the driver will stop the vehicle at the stop point and thus can perform the vehicle operation assist appropriately.

18 Claims, 13 Drawing Sheets

U.S. PATENT DOCUMENTS

| | | | | |
|---|---|---|---|---|
| 2004/0010352 | A1 | 1/2004 | Stromme | |
| 2004/0150514 | A1 | 8/2004 | Newman et al. | |
| 2005/0128063 | A1 | 6/2005 | Isaji et al. | |
| 2007/0250240 | A1 * | 10/2007 | Reisner | 701/70 |

FOREIGN PATENT DOCUMENTS

| | | | |
|---|---|---|---|
| EP | 1 383 098 | | 1/2004 |
| FR | 2 863 090 | | 6/2005 |
| JP | 10 76922 | | 3/1998 |
| JP | 2001 67596 | | 3/2001 |
| JP | 2002-190100 | A | 7/2002 |
| JP | 2003-99899 | A | 4/2003 |
| JP | 2004 310260 | | 11/2004 |
| JP | 2005 63398 | | 3/2005 |
| JP | 2005-182307 | A | 7/2005 |
| JP | 2005 316889 | | 11/2005 |

OTHER PUBLICATIONS

Japansese Office Action mailed on May 10, 2011, issued for JP Application No. 2006-212167, filed on Aug. 3, 2006 (with English translation).

* cited by examiner

1
VEHICLE OPERATION ASSIST SYSTEM
22
ECU
30
STOP ACTION LEARNING PORTION
31
DECELERATION OPERATION DETERMINATION PORTION
32
WATCHING ACTION DETECTION PERIOD SETTING PORTION
33
ASSIST CONTROL PORTION
34
RADAR SENSOR
10
VEHICLE SPEED SENSOR
12
BRAKE SENSOR
14
CCD CAMERA
16
VEHICLE NAVIGATION SYSTEM
18
SIGHTLINE DETECTION DEVICE
20

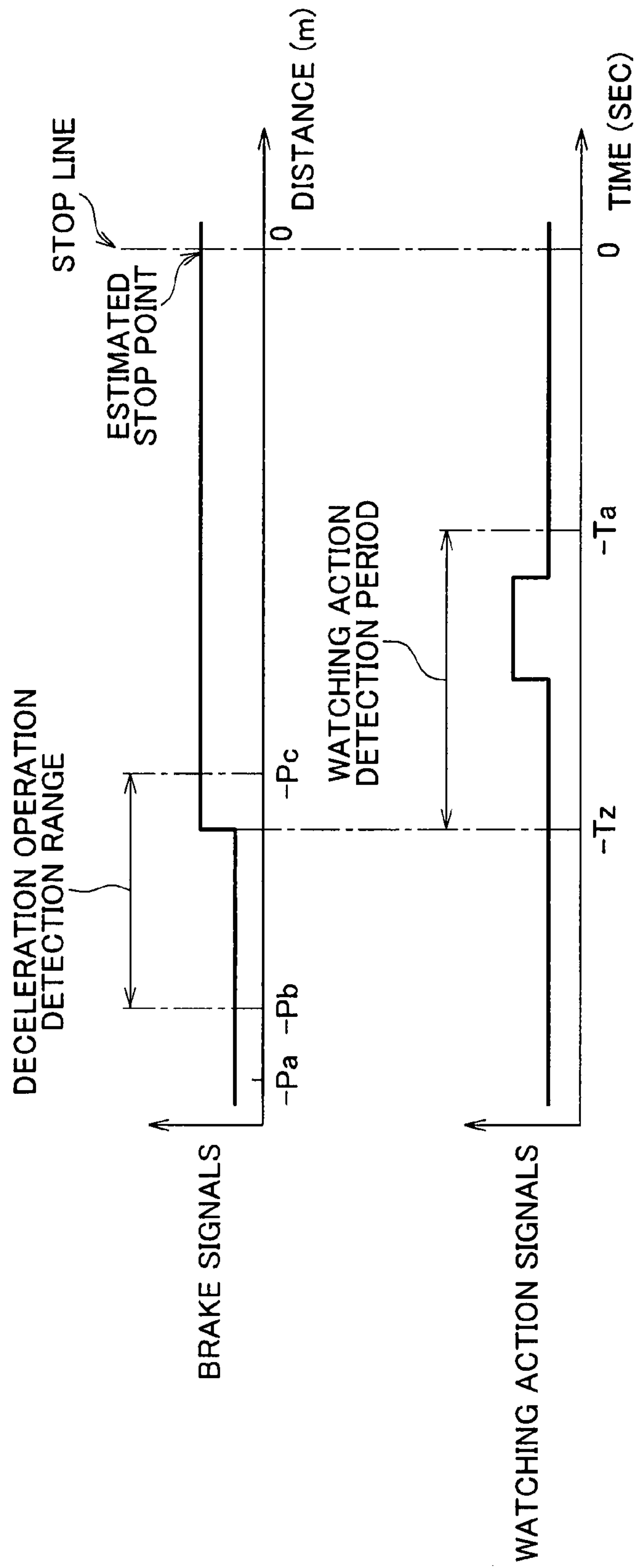
F I G . 3
STOP LINE
ESTIMATED STOP POINT
DISTANCE (m)
0
DECELERATION OPERATION DETECTION RANGE
-Pa
-Pb
-Pc
BRAKE SIGNALS
WATCHING ACTION DETECTION PERIOD
TIME (SEC)
0
-Ta
-Tz
WATCHING ACTION SIGNALS

<PRIOR ART>

FIG. 5

| PROCESS | CONTENT |
|---|---|
| PERCEPTION | PERCEIVE STOP SIGN |
| | PERCEIVE STOP LINE |
| | PERCEIVE CROSSWALK |
| | PERCEIVE CROSSING PEDESTRIAN |
| | PERCEIVE VEHICLES ON INTERSECTING ROAD |
| | PERCEIVE DECELERATION AND STOP OF PRECEDING VEHICLE |
| | DETERMINE STOP POSITION AND DECELERATION |
| DECELERATION | MOVE FOOT ONTO BRAKE PEDAL AND STEP IT DOWN |
| | WATCH STOP LINE |
| STOP | STOP VEHICLE BEFORE OR AFTER STOP LINE |
| | CHECK FRONT VIEW (CROSSING PEDESTRIAN) |
| | START VEHICLE (GENTLY ACCELERATE VEHICLE SUCH THAT VEHICLE CAN BE BRAKED ANYTIME) |
| | CHECK LEFT AND RIGHT VIEWS |
| | STOP VEHICLE AT POSITION WHERE APPROACHING VEHICLES ON INTERSECTING ROAD CAN BE SEEN |
| CONFIRMATION | CHECK ON VEHICLES ON INTERSECTING ROAD AND CHECK LEFT AND RIGHT VIEWS |
| START | START VEHICLE |
| ACCELERATION | ACCELERATE VEHICLE |

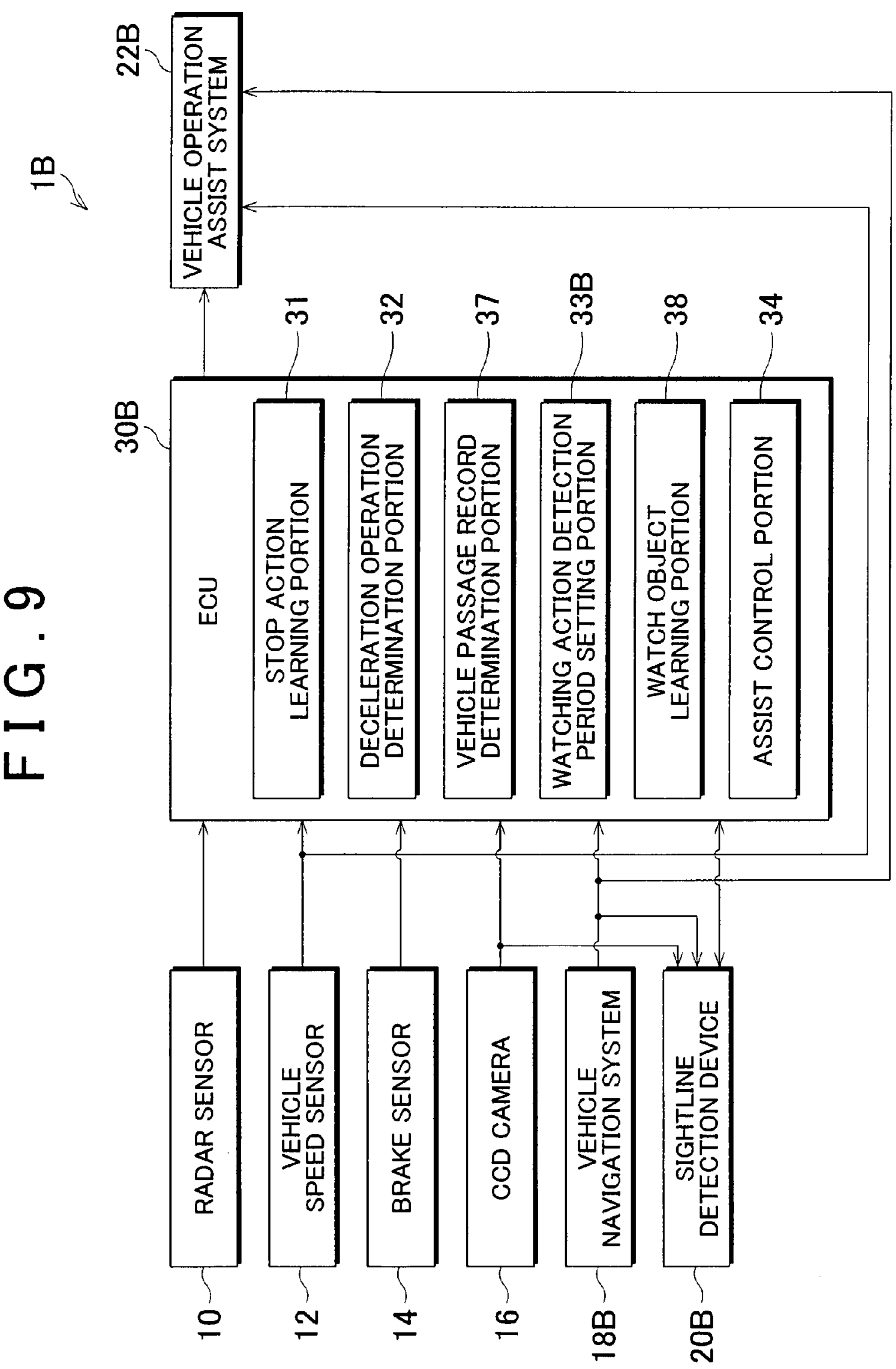
FIG. 9
1B
22B
VEHICLE OPERATION ASSIST SYSTEM
30B
ECU
31
STOP ACTION LEARNING PORTION
32
DECELERATION OPERATION DETERMINATION PORTION
37
VEHICLE PASSAGE RECORD DETERMINATION PORTION
33B
WATCHING ACTION DETECTION PERIOD SETTING PORTION
38
WATCH OBJECT LEARNING PORTION
34
ASSIST CONTROL PORTION
10
RADAR SENSOR
12
VEHICLE SPEED SENSOR
14
BRAKE SENSOR
16
CCD CAMERA
18B
VEHICLE NAVIGATION SYSTEM
20B
SIGHTLINE DETECTION DEVICE

OPERATION ASSIST APPARATUS

CROSS-REFERENCE TO RELATED APPLICATIONS

The present application claims priority to JP 2006-212,167 filed on Aug. 3, 2006, the entire contents of which are hereby incorporated herein by reference.

BACKGROUND OF THE INVENTION

1. Field of the Invention

The invention relates to an operation assist apparatus.

2. Description of the Related Art

Operation assist apparatuses for assisting to stop a vehicle are known. Among those, Japanese Patent Application Publication JP-10-76922 describes an operation assist apparatus that generates an alert or automatically brakes the vehicle if the driver is not decelerating the vehicle when the vehicle is approaching a point where vehicles need to be stopped. This operation assist apparatus determines whether the driver will stop the vehicle at the stop point based on the conditions related to the driver's deceleration operation, such as a throttle opening degree and a brake operation state.

However, it is often the case that a driver, even if he or she is unaware that there is a stop point ahead of the vehicle, decelerates the vehicle by referring to the shape of the intersection or to various traffic or road conditions. Therefore, whether a driver will stop his or her vehicle at a stop point can not be accurately determined by simply referring to the state of the driver's deceleration operation.

SUMMARY OF THE INVENTION

In view of the above, the invention has been made. A first aspect of the invention relates to an operation assist apparatus that can accurately determine whether a driver will stop his or her vehicle at a stop point and thus can appropriately assist the driver in operating the vehicle.

As a result of experiments, the inventors have discovered a common tendency that drivers exhibit at a stop point. That is, if a driver watches an indicator associated with a stop point while his or her vehicle is decelerating before a stop point, the probability that the driver will stop the vehicle at the stop point is high. On the other hand, if the driver does not watch the indicator while the vehicle is decelerating before the stop point, the probability that the driver will not stop the vehicle is high. Namely, when the driver did not watch the indicator when decelerating the vehicle before the stop point, it is likely that the driver overlooked the stop point. The "stop point" represents a point where drivers are obliged to stop their vehicles. The "indicator associated with a stop point" is, for example, a stop line or a road sign.

In view of the above, the operation assist apparatus according to the first aspect of the invention includes an assist controller that assists a driver of a vehicle in operating the vehicle before a stop point and a watching action detector that detects a watching action of the driver for watching the stop point. The assist controller changes an assist manner in which to assist the vehicle operation by the driver in accordance with whether the watching action was detected by the watching action detector during deceleration of the vehicle.

According to the operation assist apparatus described above, the assist controller changes the manner of the vehicle operation assist in accordance with whether the watching action of the driver for watching the stop point was detected by the watching action detector when decelerating the vehicle before the stop point. Thus, whether the driver will stop the vehicle at the stop point can be accurately determined, and the vehicle operation assist can be appropriately performed.

In the operation assist apparatus described above, the assist controller may change the assist manner so as to advance the timing to start assisting the vehicle operation by the driver if the watching action was not detected during deceleration of the vehicle.

According to this structure, when the watching action was not detected during deceleration of the vehicle, the assist controller advances the timing to start assisting the vehicle operation by the driver. Thus, the vehicle operation assist can be prevented from being performed in a manner interfering with the driver, and the vehicle operation assist can be performed in a safer manner when the driver has overlooked the stop point.

The operation assist apparatus described above may further include a sightline direction detector that detects the direction of the driver's sightline and an indicator position detector that detects the position of an indicator associated with the stop point, and the watching action detector may detect the watching action of the driver based on the direction of the driver's sightline that has been detected by the sightline direction detector and the position of the indicator that has been detected by the indicator position detector.

According to this structure, the watching action detector detects a watching action of the driver based on the direction of the driver's sightline and the position of the indicator associated with the stop point. This increases the accuracy in detecting whether the driver has watched the stop point and thus increases the accuracy in determining whether the driver will stop the vehicle at the stop point.

The operation assist apparatus described above may further include: a stop point position detector that detects the position of a stop point that is present ahead of the vehicle in the traveling direction of the vehicle; a deceleration operation detector that detects a deceleration operation by the driver; and a setting device that, when a stop point position has been detected by the stop point position detector and a deceleration operation by the driver has been detected by the deceleration operation detector, sets a watching action detection period during which to detect a watching action of the driver based on the time the deceleration operation was started, and the assist controller may change the assist manner in accordance with whether a watching action was detected during the watching action detection period set by the setting device.

According to this structure, when a stop point position has been detected by the stop point position detector and a deceleration operation by the driver has been detected by the deceleration operation detector, the setting device sets a watching action detection period based on the time the deceleration operation was started. Therefore, the watching action detection period can be set while the vehicle is being decelerated before the stop point. Also, because the assist controller changes the assist manner in accordance with whether a watching action was detected during the watching action detection period, whether the driver will stop the vehicle at the stop point can be accurately determined, and thus the vehicle operation assist can be performed appropriately.

In the operation assist apparatus described above, the setting device may estimate a time needed to stop the vehicle and factor in the estimated time when setting the watching action detection period.

According to the result of the experiments conducted by the inventors, whether the driver will stop the vehicle at the stop point can be determined based on whether the driver watches an indicator associated with the stop point immediately before the time the vehicle is estimated to stop the stop point.

Thus, according to the structure described above, because the setting device estimates the time needed to stop the vehicle and factors in the estimated time when setting the watching action detection period, a watching action that the driver takes immediately before the time the vehicle is estimated to stop at the stop point can be detected. This increases the accuracy in detecting a watching action of the driver and thus increases the accuracy in determining whether the driver will stop the vehicle at the stop point.

The operation assist apparatus described above may further include a watching timing learning device that learns a timing at which the driver takes a watching action, and the setting device may correct the watching action detection period in accordance with the timing learned by the watching timing learning device.

According to this structure, because the setting device corrects the watching action detection period in accordance with the timing learned by the watching timing learning device, the watching action detection period can be changed according to the habit of the driver. This increases the accuracy in detecting an watching action of the driver and thus increases the accuracy in determining whether the driver will stop the vehicle at the stop point.

The operation assist apparatus described above may further include a delay time obtaining device that obtains a delay time of a watching action based on external conditions surrounding the vehicle and a state of the driver, and the setting device may correct the watching action detection period in accordance with the delay time obtained by the delay time obtaining device.

The "external conditions surrounding the vehicle" include, for example, whether the preceding vehicle stops at the stop point, the traveling direction of the vehicle, and the ratio between the width of the road on which the vehicle is traveling and the width of an intersecting road. The "state of the driver" refers to, for example, whether the driver is speaking. Depending upon the external conditions surrounding the vehicle and the state of the driver, the timing the driver watches the indicator associated with the stop point may be delayed.

According to the structure descried above, however, because the delay time obtaining device obtains a delay time of a watching action based on external conditions surrounding the vehicle and the state of the driver and the setting device corrects the watching action detection period in accordance with the obtained delay time, a watching action of the driver can be accurately detected even if the watching action is delayed for some reason related to the external conditions surrounding the vehicle or to the state of the driver. This increases the accuracy in detecting a watching action of the driver and thus increases the accuracy in determining whether the driver will stop the vehicle at the stop point.

The operation assist apparatus described above may further include a recording device that keeps a vehicle passage record for each stop point and a watch object learning device that, when the vehicle is about to pass through a stop point that is recorded in the recording device as the stop point that the vehicle has ever passed through, learns a watch object other than a road sign associated with the stop point, and the watching action detector may detect a watching action of the driver for watching the watch object learned by the watch object learning device and identify the detected watching action as a watching action for watching the stop point.

When the vehicle is traveling on a known road and therefore the possibility that the driver has already perceived the presence of a stop point ahead of the vehicle is high, the driver may stop the vehicle at the stop point by referring to, as an stop point indicator, an object other than road signs associated with the stop point (e.g., stop lines).

According the structure described above, however, the watch object learning device, when the vehicle is about to pass through a stop point that is recorded in the recording device as the stop point that the vehicle has ever passed through, learns a watch object other than road signs associated with the stop point, and the watching action detector detects a watching action of the driver for watching the watch object learned by the watch object learning device and identifies the detected watching action as a watching action for watching the stop point. Thus, whether the driver has watched the stop line can be accurately detected and thus whether the driver will stop the vehicle at the stop point can be accurately determined.

In the operation assist apparatus described above, the assist controller may assist the vehicle operation by the driver by automatically adjusting the braking force to be applied to the vehicle.

According to this structure, because the assist controller automatically adjusts the braking force to be applied to the vehicle, the vehicle operation assist can be performed in a safer manner.

As such, the operation assist apparatus according to the invention can accurately determine whether the driver will stop the vehicle at the stop point, and therefore the vehicle operation assist can be appropriately performed.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 3 is a timechart indicating the processes that the ECU executes sequentially;

FIG. 5 is a table showing the result of the analysis on the actions that a driver takes at an intersection with a stop point;

FIG. 9 is a view showing the configuration of an operation assist apparatus according to the third exemplary embodiment of the invention;

DETAILED DESCRIPTION OF THE EXEMPLARY EMBODIMENTS

In the following description and the accompanying drawings, the present invention will be described in more detail with reference to exemplary embodiments. Note that like elements will be denoted by like numerals in each drawing.

Figure 1:
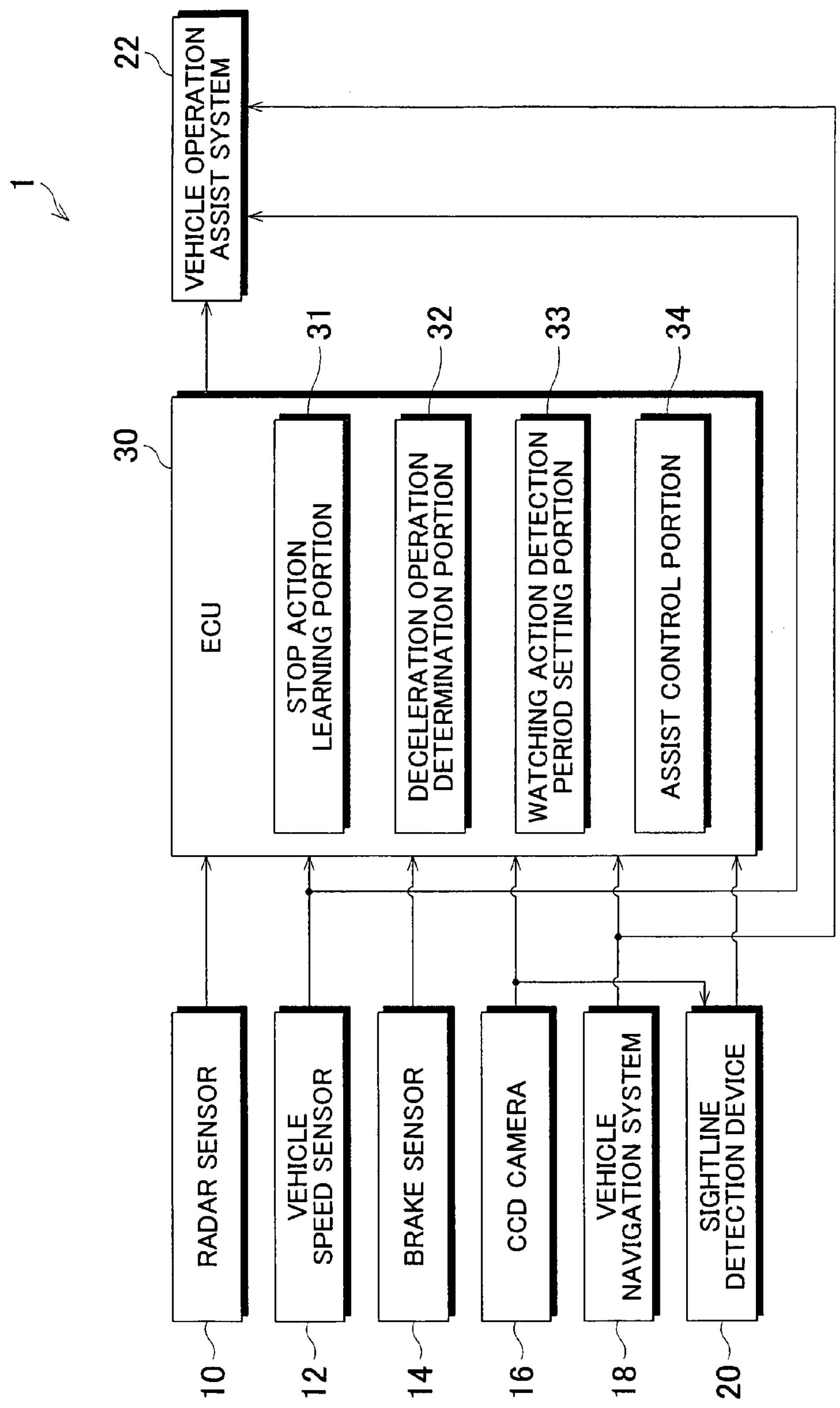
FIG. 1 is a view showing the configuration of an operation assist apparatus according to the first exemplary embodiment of the invention.

FIG. 1 shows the configuration of an operation assist apparatus according to the first exemplary embodiment of the invention. The operation assist apparatus 1 shown in FIG. 1 is an apparatus that assists the driver in stopping the vehicle at a stop point. The "stop point" represents a point at which drivers are obliged to stop their vehicles. The operation assist apparatus 1 has a radar sensor 10, a vehicle speed sensor 12, a brake sensor 14, a CCD camera 16, a vehicle navigation system 18, a sightline detection device 20, a vehicle operation assist system 22, an electronic control unit 30 (will hereinafter be referred to as an "ECU 30").

The radar sensor 10 detects the distance between the subject vehicle and other vehicle. The radar sensor 10 is, for example, a millimeter-wave radar sensor that receives and outputs millimeter-wave signals. The radar sensor 10 provides the ECU 30 with "radar signals" indicating the detected distance from the subject vehicle to the other vehicle and the detected speed of the other vehicle.

The vehicle speed sensor 12 detects the speed of the vehicle. For example, the vehicle speed sensor 12 detects the speed of the vehicle by detecting the rotation speed of the wheels of the subject vehicle. The vehicle speed sensor 12 provides the ECU 30 with "vehicle speed signals" indicating the detected speed of the subject vehicle.

The brake sensor 14 detects deceleration operation by the driver by detecting whether the driver is operating the brake pedal. The brake sensor 14 provides the ECU 30 with "brake signals" indicating whether the driver is operating the brake pedal.

The CCD camera 16 captures images of the view of a predetermined area ahead of the vehicle. The CCD camera 16 provides the sightline detection device 20 and the ECU 30 with "image signals" carrying the captured images.

The vehicle navigation system 18 stores road information including the locations of stop points. The vehicle navigation system 18 detects the stop point ahead of and closest to the vehicle and obtains the distance to that stop point. The vehicle navigation system 18 provides the vehicle operation assist system 22 and the ECU 30 with "vehicle navigation signals" indicating the location of and the distance to each stop point.

The sightline detection device 20 captures an image of the driver and detects the direction of the driver's sightline from the captured image (sightline direction detector). Receiving the image signals from the CCD camera 16, the sightline detection device 20 extracts an image of the view area of the driver from the images carried by the image signals. By processing this image, the sightline detection device 20 detects the positions of indicators associated with stop points (indicator position detector). The "indicators associated with stop points" are, for example, stop lines and road signs. In the following, for the sake of clarity of description, stop lines will be recited as the indicators associated with stop points.

The sightline detection device 20 plots the direction of the driver's sightline on the image of the driver's view area, and if the direction of the driver's sightline coincides with the direction to a stop line, the sightline detection device 20 determines that the driver has watched the stop line (watching action detector).

Figure 2:
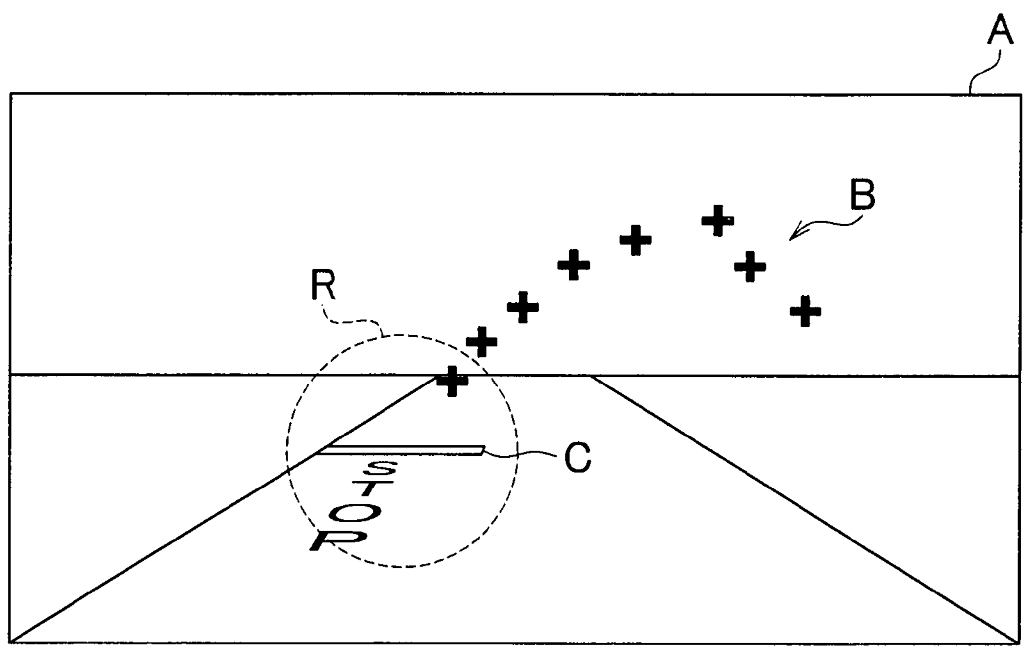
FIG. 2 is a view illustrating the principal of the watching action detection by a sightline detection device.

FIG. 2 illustrates the principal of the watching action detection by the sightline detection device 20. In FIG. 2, marks B indicating the direction of the driver's sightline are plotted on a view area image A at given time intervals. In the first exemplary embodiment, the sightline detection device 20 determines that the driver' sightline is directed to the position of a stop line C and the direction of the driver's sightline is coinciding with the direction to the stop line C if the marks B indicating the direction of the driver's sightline have been within a watching recognition radius R from the center of the stop line C for 1.5 seconds or longer. The sightline detection device 20 provides the ECU 30 with "watching action signals" indicating whether the driver has watched the stop line.

Next, the ECU 30 will be described with reference to FIG. 1 and FIG. 3. FIG. 3 is a time-chart indicating the processes that the ECU 30 executes sequentially. The ECU 30 is constituted of a microprocessor for performing various computations and calculations, a ROM (Read Only Memory) for storing various programs, and the like, on which the microprocessor executes various processes, a RAM (Random Access Memory) for recording various data, such as the results of various computations and calculations, a back-up RAM for storing specific data using the power supplied from a 12V battery, etc.

Thus configured, the ECU 30 has a stop action learning portion 31, a deceleration operation determination portion 32, a watching action detection period setting portion (setting device) 33, and an assist control portion 34.

The stop action learning portion 31 learns whether the driver normally stops the vehicle at a stop point. More specifically, the stop action learning portion 31 keeps a record of the number of times the vehicle has passed through a stop point (will be referred to as "vehicle passage number" where appropriate) and a record of the number of times the vehicle has stopped at a stop point (will be referred to as "vehicle stop number" where appropriate). Using these numbers, the stop action learning portion 31 calculates the percentage of times the driver has stopped the vehicle at a stop point (will be referred to as "vehicle stop percentage"). In the first exemplary embodiment, if the calculated vehicle stop percentage is higher than 80%, the stop action learning portion 31 learns that the driver normally stops the vehicle at a stop point.

Thus, the stop action learning portion 31 determines whether the vehicle has stopped at each stop point, and the stop action learning portion 31 counts the number of times this determination has been made, i.e., the vehicle passage number stated above, and counts the number of times the vehicle has stopped at a stop point, i.e., the vehicle stop number stated above.

More specifically, at each stop point, the stop action learning portion 31 receives the radar signals from the radar sensor 10, the speed signals from the vehicle speed sensor 12, and the vehicle navigation signals from the vehicle navigation system 18. Then, based on the position of the stop point and the distance from the subject vehicle to the stop point which are indicated by the vehicle navigation signals, the stop action learning portion 31 identifies the area extending 5 meters forward and 5 meters backward from the stop point. If the vehicle speed indicated by the speed signals has decreased down to 0 km/h within this area, the stop action learning portion 31 determines that the vehicle has stopped at the stop line. Note that the stop action learning portion 31 may alternatively determine that the vehicle has stopped at the stop line in response to the vehicle speed decreasing down to, for example, 5 km/h or below in the aforementioned area. The stop action learning portion 31 counts and records the vehicle passage number and the vehicle stop number.

Meanwhile, the stop action learning portion 31 may be adapted not to increment the count of the vehicle passage number and the count of the vehicle stop number if the radar signals are indicating that there is a vehicle ahead of the subject vehicle. That is, in such a case, it may not have been the driver's intention to stop the vehicle at the stop point.

The deceleration operation determination portion 32 determines whether the driver has started deceleration operation. At this time, more specifically, the deceleration operation determination portion 32 receives the brake signals from the brake sensor 14, the image signals from the CCD camera 16, and the vehicle navigation signals from the vehicle navigation system 18. Based on the received image signals and vehicle navigation signals, the deceleration operation determination portion 32 obtains the distance from the subject vehicle to the stop line. As shown in FIG. 3, in response to the distance from the subject vehicle to the stop line reaching a predetermined value Pa, the deceleration operation determination portion 32 determines whether brake operation has been detected from the brake signals within a deceleration operation detection range between a point Pb before the stop line and a point Pc before the stop line, which have been preliminary set. If no brake operation has been detected within this range, the deceleration operation determination portion 32 sends forced control signals to the vehicle operation assist system 22. In the first exemplary embodiment, the deceleration operation detection range is from the point 50 meters before the stop line to the point 20 meters before the stop line.

The watching action detection period setting portion 33 receives the speed signals from the vehicle speed sensor 12 and the vehicle navigation signals from the vehicle navigation system 18. The watching action detection period setting portion 33 calculates an estimated time Tz to the vehicle stopping at a stop point by the following expression (1) that uses a present speed V of the subject vehicle, which is indicated by the speed signals, a present distance D from the subject vehicle to the stop line, which is indicated by the vehicle navigation signals, and a present deceleration Gb that is obtained based on the amount by which the present speed V has changed over a predetermined time interval.

$$D=\frac{1}{2}\times Gb\times Tz2+V\times Tz \quad (1)$$

The watching action detection period setting portion 33 receives the brake signals form the brake sensor 14. In response to a start of brake operation being detected from the brake signals, the watching action detection period setting portion 33 sets the time of the start of brake operation as the beginning of the watching action detection period. The watching action detection period setting portion 33 sets the watching action detection period to the time period obtained by subtracting a predetermined time Ta from the estimated time Tz, which is an estimated time to the vehicle stopping at the stop point and has been calculated as described above, whereby the end of the watching action detection period is set. Assuming that the point at which the vehicle is estimated to stop corresponds to the 0 sec point, the watching action detection period setting portion 33, as shown FIG. 3, sets the time period from −Tz to −Ta as the watching action detection period. In the first exemplary embodiment, the predetermined time period Ta is a time period in which the vehicle can be stopped using predetermined decelerations G1, G2 that are set for a first stop assist and a second stop assist, respectively, which will be described later. The watching action detection period is approximately from −3 sec to −5 sec.

The assist control portion 34 determines whether the driver has watched the stop line within the watching action detection period set by the watching action detection period setting portion 33 and controls the vehicle operation assist system 22. More specifically, if the assist control portion 34 has received the watching action signals from the sightline detection device 20 within the watching action detection period, the assist control portion 34 outputs control signals requiring the first stop assist to the vehicle operation assist system 22. On the other hand, if the assist control portion 34 has not received the watching action signals from the sightline detection device 20 within the watching action detection period, the assist control portion 34 outputs control signals requiring the second stop assist to the vehicle operation assist system 22.

The vehicle operation assist system 22 is a system that assists the driver in operating the vehicle before a stop line, and the vehicle operation assist system 22 changes the manner in which to assist the driver's operation according to the forced control signals and the control signals from the ECU 30. When the vehicle operation assist system 22 has received the control signals from the ECU 30, the vehicle operation assist system 22 performs the first stop assist or the second stop assist in accordance with the received control signals. When the vehicle operation assist system 22 has received the forced control signals from the ECU 30, the vehicle operation assist system 22 performs a third stop assist. For example, the vehicle operation assist system 22 is a brake-assist system or a pre-crush safety system (PCS) which automatically brakes the vehicle as needed by controlling the brake pressures of the brake actuators, etc.

More specifically, the vehicle operation assist system 22 receives the speed signals from the vehicle speed sensor 12 and the vehicle navigation signals from the vehicle navigation system 18. When the control signals from the ECU 30 are requiring the first stop assist, the vehicle operation assist system 22 calculates the distance needed to stop the vehicle from the present vehicle speed of the vehicle indicated by the speed signals and the predetermined deceleration G1. Then, the vehicle operation assist system 22 executes the first stop assist using the predetermined deceleration G1 immediately before the calculated stop distance exceeds the distance from the vehicle to the stop line, which is indicated by the vehicle navigation signals. In the first exemplary embodiment, the predetermined deceleration G1 is 0.4 G.

Meanwhile, if the control signals from the ECU 30 are requiring the second stop assist, the vehicle operation assist system 22 calculates the distance needed to stop the vehicle from the present vehicle speed of the vehicle indicated by the speed signals and the predetermined deceleration G2. Then, the vehicle operation assist system 22 executes the second stop assist using the predetermined deceleration G2 at the moment the calculated stop distance exceeds the distance from the vehicle to the stop line, which is indicated by the vehicle navigation signals. In the first exemplary embodiment, the predetermined deceleration G2 is 0.2 G.

Figure 4A:
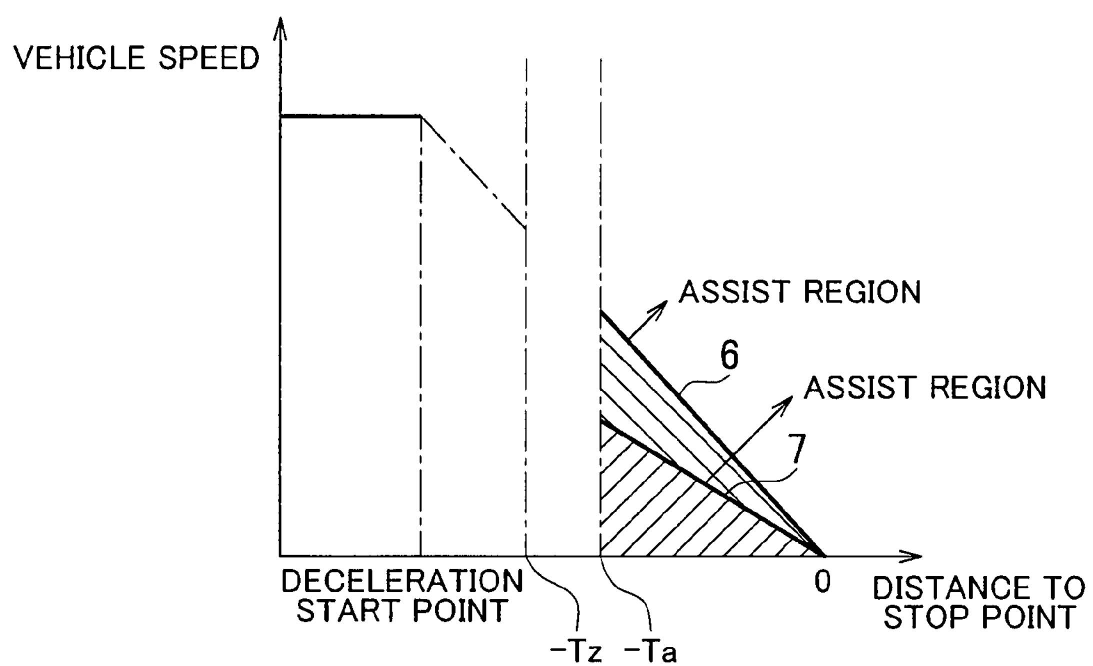
FIG. 4A and FIG. 4B are charts illustrating the principal of the stop assist executed by the operation assist apparatus of the first exemplary embodiment and the principal of the stop assist executed by a conventional operation assist apparatus, respectively.
Figure 4B:
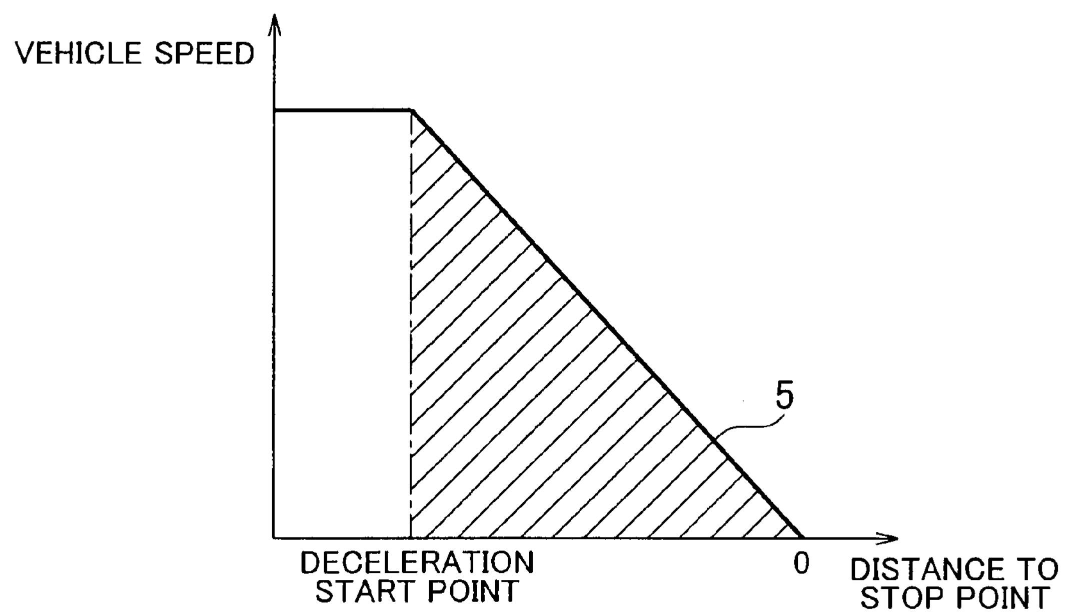

FIG. 4A and FIG. 4B are charts illustrating the principal of the stop assist executed by the operation assist apparatus of the first exemplary embodiment and the principal of the stop assist executed by a conventional operation assist apparatus, respectively. FIG. 4B illustrates the principal of the stop assist executed by the convention operation assist apparatus. In FIG. 4B, the line 5 represents a boundary defining whether to execute a stop assist using deceleration of 0.4 G. That is, this boundary represents an assist deceleration threshold. The shaded area defined by the line 5 represents a no-assist region where it is not necessary to execute any stop assist. The blank area on the opposite side of the shade area across the line 5 represents an assist region where it is necessary to execute a stop assist.

Meanwhile, FIG. 4A illustrates the principals for the first and second stop assists that are executed by the vehicle operation assist system 22 of the first exemplary embodiment. In FIG. 4A, the line 6 represents a boundary defining whether to execute the first stop assist using the predetermined deceleration G1 (0.4 G). That is, this boundary represents an assist deceleration threshold. The shaded area defined by the line 6 represents a no-assist region where it is not necessary to execute any stop assist. The blank area on the opposite side of this shade area across the line 6 represents an assist region where it is necessary to execute a stop assist. Likewise, the line 7 represents a boundary defining whether to execute the second stop assist using the predetermined deceleration G2 (0.2 G). That is, this boundary also represents an assist deceleration threshold. The shaded area defined by the line 7 represents a no-assist region where it is not necessary to execute any stop assist. The blank area on the opposite side of this shade area across the line 7 represents an assist region where it is necessary to execute a stop assist. The time period from −Tz to −Ta is the watching action detection period.

Thus, according to the vehicle operation assist system 22, because the predetermined deceleration G2 for the second stop assist is smaller than the predetermined deceleration G1 for the first stop assist, the beginning of the first stop assist is earlier than the beginning of the second stop assist.

Also, in response to the forced control signals from the ECU 30, the vehicle operation assist system 22 calculates the deceleration Ga needed for the vehicle to decelerate to 0 km/h at the stop line from the present distance from the vehicle to the stop line, which is indicated by the vehicle navigation signals, and the present speed of the vehicle, which is indicated by the speed signals. In the first exemplary embodiment, if the calculated deceleration Ga is greater than the predetermined deceleration G1, the vehicle operation assist system 22 determines that the driver is taking no action to decelerate the vehicle despite the fact that the vehicle needs to be braked immediately, and then the vehicle operation assist system 22 immediately brakes the vehicle with the deceleration Ga.

Next, the operation of the operation assist apparatus 1 will be described. First, the process 1 will be described. The stop action learning portion 31 learns whether the driver normally stops the vehicle at stop points. More specifically, the stop action learning portion 31 calculates the stop percentage in the past from the number of times the vehicle has passed a stop point and the number of times the vehicle has stopped at a stop point. If the calculated stop percentage is higher than 80%, the stop action learning portion 31 learns that the driver normally stops the vehicle at stop points.

Because the vehicle operation assist according to the invention is not applicable to drivers who normally do not stop the vehicle at stop points, no description will be made in conjunction with such drivers.

The radar sensor 10 detects the speed of other vehicle and provides the ECU 30 with the radar signals indicating the detected speed of the other vehicle. The vehicle speed sensor 12 detects the speed of the vehicle and provides the vehicle operation assist system 22 and the ECU 30 with the speed signals indicating the detected speed of the vehicle. The CCD camera 16 captures images of the views ahead of the vehicle and provides the sightline detection device 20 and the ECU 30 with the image signals carrying the captured images. The vehicle navigation system 18 provides the vehicle operation assist system 22 and the ECU 30 with the vehicle navigation signals indicating the position of the stop point and the distance to the stop point. The sightline detection device 20 detects the driver's sightline from the image of the driver and detects the position of the stop line from the image signals from the CCD camera 16, and the sightline detection device 20 provides the ECU 30 with the watching action signals indicating whether the driver has watched the stop line, which is determined based on whether the detected sightline of the driver coincides with the direction to the stop line as mentioned above.

Next, the process 2 will be described. the deceleration operation determination portion 32 determines whether the driver has started to decelerate the vehicle. More specifically, the deceleration operation determination portion 32 determines whether the brake signals have indicated a start of brake operation within the deceleration operation start detection range -Pb to -Pc that ranges from the point 50 meters before the stop line to the point 20 meters before the stop line.

Next, the process 3 will be described. If the deceleration operation determination portion 32 has determined that the driver has not yet started to decelerate the vehicle, the forced control signals are sent to the vehicle operation assist system 22, so that the vehicle operation assist system 22 executes the third stop assist. More specifically, at this time, the deceleration operation determination portion 32 calculates the deceleration Ga needed to stop the vehicle at the stop line from the present speed of the vehicle and the present distance from the vehicle to the stop line. If the calculated deceleration Ga is greater than a predetermined value Gmax, the deceleration operation determination portion 32 determines that the driver is not taking any action to decelerate the vehicle despite the fact that the vehicle needs to be braked immediately, and thus the vehicle is automatically braked with the calculated deceleration Ga. On the other hand, if the calculated deceleration Ga is equal to or less than the predetermined value Gmax, the third stop assist process described above is repeated by the vehicle operation assist system 22.

Next, the process 4 will be described. If the deceleration operation determination portion 32 has determined that the driver has started to decelerate the vehicle, the watching action detection period setting portion 33 calculates the estimated time Tz, which is the time to the vehicle stopping at the stop point, from the expression (1) using the present speed V, the present distance D to the stop line, and the present deceleration Gb.

Next, the process 5 will be described. The watching action detection period setting portion 33 sets the watching action detection period. More specifically, the time the driver started to brake the vehicle is set as the beginning of the watching action detection period, and the watching action detection period is set to the time period obtained by subtracting the predetermined time Ta from the estimated time Tz, which is an estimated time to the subject vehicle stopping at the stop point, whereby the end of the watching action detection period is set. That is, assuming that the point at which the vehicle is estimated to stop corresponds to the 0 sec point, the watching action detection period is set to the time period from −Tz to −Ta.

Then, the assist control portion 34 determines whether the driver watched the stop line during the watching action detection period −Tz to −Ta and outputs the control signals corresponding to the result of the determination. More specifically, at this time, if the watching action signals indicating that the driver has watched the stop line are received from the sightline detection device 20 during the watching action detection period −Tz to −Ta, the assist control portion 34 then outputs the control signals requiring the first control assist. On the other hand, if the watching action signals indicating that the driver has not watched the stop line are received from the sightline detection device 20 during the watching action detection period −Tz to −Ta, the assist control portion 34 then outputs the control signals requiring the second control assist.

Next, the process 6 will be described. When the assist control portion 34 outputs the control signals requiring the first stop assist, the vehicle operation assist system 22 executes the first stop assist. More specifically, at this time, the distance needed to stop the vehicle is calculated from the present speed of the subject vehicle and the predetermined deceleration G1 (0.4 G). Then, the vehicle is automatically braked at the predetermined deceleration G1 (0.4 G) from immediately before the calculated stop distance exceeds the present distance from the subject vehicle to the stop line. In other words, the subject vehicle is automatically braked using the assist deceleration threshold G1 (0.4 G) from immediately before the operation point of the subject vehicle defined by the relation between the present speed of the subject vehicle and the present distance from the subject vehicle to the stop line in FIG. 4A enters the assist region across the line 6 from the shaded area.

Next, the process 7 will be described. When the assist control portion 34 outputs the control signals requiring the second stop assist, the vehicle operation assist system 22 executes the second stop assist. More specifically, at this time, the distance needed to stop the vehicle is calculated from the present speed of the subject vehicle and the predetermined deceleration G2 (0.2 G). Then, the vehicle is automatically braked at the predetermined deceleration G2 (0.2 G) from the moment the calculated stop distance exceeds the present distance from the subject vehicle to the stop line. In other words, the vehicle is automatically braked using the assist deceleration threshold G2 (0.2 G) from the moment the operation point of the subject vehicle defined by the relation between the present speed of the subject vehicle and the present distance from the subject vehicle to the stop line in FIG. 4A enters the assist region across the line 7 from the shaded area.

Next, the analyzed result of the experiment conducted by the inventors will be described. The table in FIG. 5 shows the result of the analysis on the actions that a driver takes at an intersection with a stop point. Referring to FIG. 5, the driver's actions at an intersection with a stop point are classified into 6 processes; a perception process, a deceleration process, a stop process, a confirmation process, a start process, and an acceleration process.

Detailed analysis on each process revealed the following. The perception process involves a process in which the driver perceives a stop-sign, a process in which the driver perceives a stop-line, a process in which the driver perceives a cross-walk, a process in which the driver preserves crossing pedestrians, a process in which the driver perceives vehicles traveling on the intersecting road, a process in which the driver perceives that the preceding vehicle decelerates and stops, and a process in which the driver perceives the deceleration and the stop position of the preceding vehicle, and these processes sequentially occur in this order. Likewise, the deceleration process involves a process in which the driver moves his or her foot onto the brake pedal and then steps the brake pedal down and a process in which the driver watches the stop line, which sequentially occur in this order. The stop process involves a process in which the driver stops the vehicle at a point before or after the stop line, a process in which the driver checks the front view (especially the driver checks whether any pedestrian is crossing), a process in which the driver starts the vehicle (the driver accelerates the vehicle gently so that the drive can step the brake pedal down any time), a process in which the driver checks the left and right views, and a process in which the driver stops the vehicle at a point where the driver can see the vehicles traveling on the intersecting road, which sequentially occur in this order. The confirmation process involves a process in which the driver checks on the vehicles traveling on the intersecting road and checks the left and right views. The start process and the acceleration process involve a process in which the driver starts the vehicle and a process in which the driver accelerates the vehicle, respectively.

The inventors have analyzed the result of the experiment and discovered the following. If a driver has watched the stop line, the probability that the driver will decelerate his or her vehicle subsequently is high. On the other hand, if a driver has not watched the stop line, the probability that the driver will not decelerate his or her vehicle subsequently is high. More specifically, if a driver watches, during deceleration of his or her vehicle, the stop line in a time period from the time point about five seconds before when the vehicle is estimated to stop at the stop line to the time point about three seconds before when the vehicle is estimated to stop at the stop line, the probability that the driver will stop the vehicle at the stop line is high. On the other hand, if the driver does not watch the stop line in the aforementioned time period during deceleration of the vehicle, the probability that the driver will not stop the vehicle at the stop line is high. That is, when the driver has watched the stop line after starting to brake the vehicle, it is very likely that the driver has perceived the stop line. On the other hand, when the driver has not watched the stop line after starting to brake the vehicle, it is very likely that the driver has overlooked the stop line.

According to the operation assist apparatus 1 of the first exemplary embodiment, because the assist control portion 34 determines whether the sightline detection device 20 has detected the driver having watched each stop point, whether the driver will stop the subject vehicle at each stop point can be accurately determined. Also, based on the result of this detection by the assist control portion 34 regarding the watching action of the driver, the vehicle operation assist system 22 changes the assist manner for assisting the driver's operation (the first stop assist, the second stop assist, and the third stop assist). As such, the vehicle operation assist can be performed appropriately.

Further, according to the operation assist apparatus 1 of the first exemplary embodiment, if no watching action has been detected during deceleration of the subject vehicle, the assist control portion 34 and the vehicle operation assist system 22 execute the second stop assist that starts braking the vehicle earlier than the first stop assist does. As such, the stop assist can be prevented from being performed in a manner that may interfere with the driver when the driver has perceived the stop point, and the stop assist can be executed in a safer manner when the driver has overlooked the stop point. Further, because the second stop assist starts earlier than the first stop assist does, the predetermined deceleration G2 for the second stop assist can be made smaller than the predetermined deceleration G1 for the first stop assist, and this will reduce the possibility of interfering with the driver when the driver has overlooked the stop line.

Further, according to the operation assist apparatus 1 of the first exemplary embodiment, the sightline detection device 20 detects a watching action of the driver based on whether the direction of the driver's sightline and the direction to the stop line are coinciding with each other. This increases the accuracy in detecting whether the driver has perceived the stop line and thus increases the accuracy in determining whether the driver will stop the subject vehicle at the stop line.

Further, according to the operation assist apparatus 1, when the vehicle navigation system 18 has detected a stop line and the brake sensor 14 detects a deceleration operation by the driver, the watching action detection period setting portion 33 sets the watching action detection period, which is a time period for decelerating the subject vehicle before the stop point, based on the time the deceleration operation was started. This also increases the accuracy in detecting a watching action of the driver and thus increases the accuracy in determining whether the driver will stop the vehicle at the stop point.

Further, according to the operation assist apparatus 1 of the first exemplary embodiment, the watching action detection period setting portion 33 estimates the time Tz needed to stop the subject vehicle, and the predetermined time Ta, which corresponds to the end of the watching action detection period, is set based on the estimated time Tz. As such, it is possible to set the watching action detection period to the time period from about three seconds before the time the vehicle is estimated to stop at the stop point to about five seconds before the time the vehicle is estimated to stop at the stop point (the experimental result shows that if the driver watches a stop point in this time period, the probability that the driver will stop the vehicle at the stop point is high). This increases the accuracy in detecting a watching action of the driver and thus increases the accuracy in determining whether the driver will stop the vehicle at the stop point. As such, the vehicle operation assist can be performed more appropriately.

Further, according to the operation assist apparatus 1 of the first exemplary embodiment, vehicle stop errors are detected based on the driver's action for decelerating the subject vehicle and the driver's action for watching a stop point indicator during the watching action detection period immediately before the time the subject vehicle is estimated to stop at the stop point indicator. Therefore, vehicle stop errors can be detected accurately and at an early stage as compared to conventional methods in which vehicle stop errors are detected from driver's deceleration actions, and therefore the assist for stopping a vehicle at a stop point can be activated at an earlier time and in a safer manner.

Figure 6:
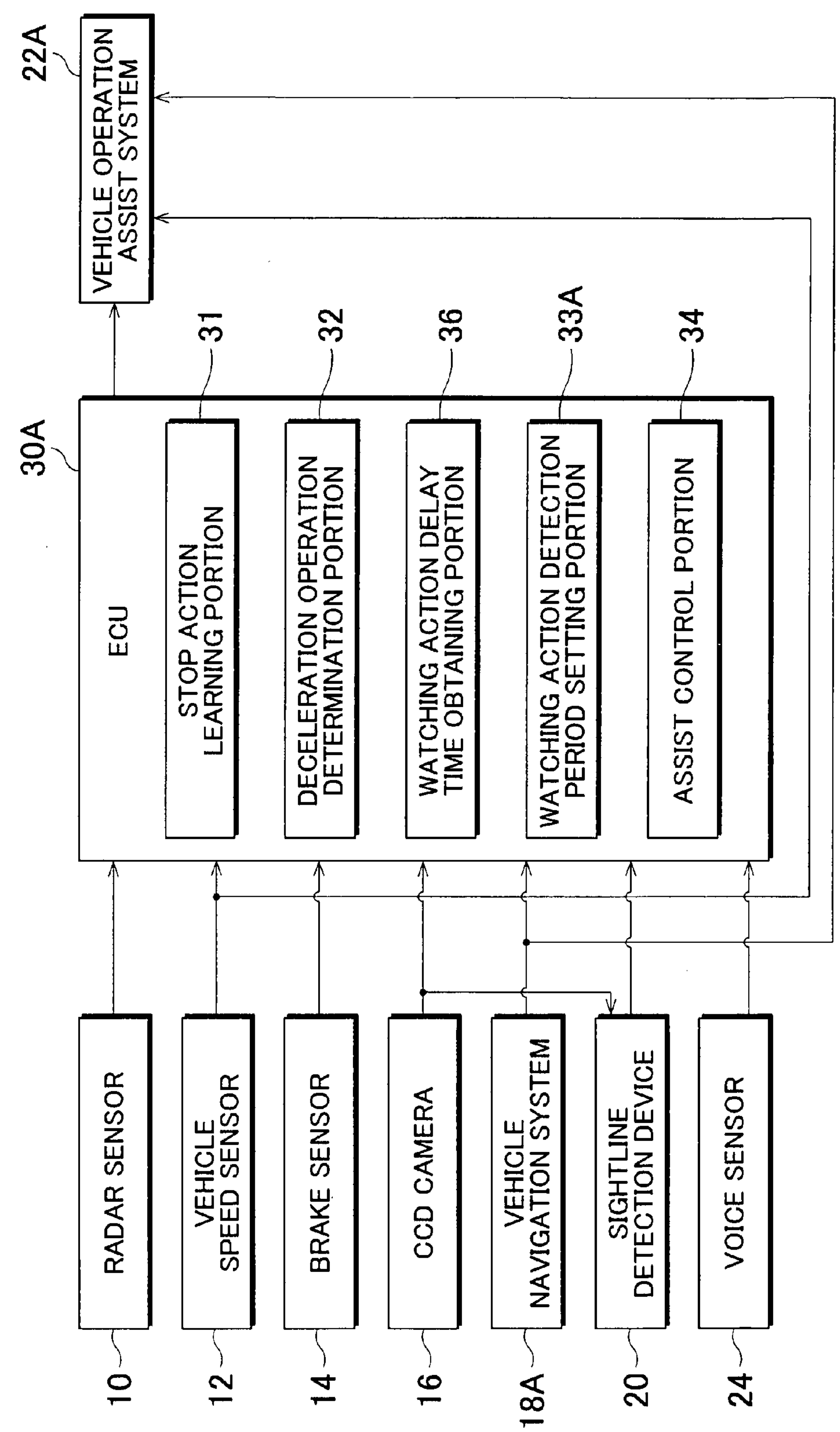
FIG. 6 is a view showing the configuration of an operation assist apparatus according to the second exemplary embodiment of the invention.

FIG. 6 shows the configuration of an operation assist apparatus according to the second exemplary embodiment of the invention. The operation assist apparatus 1A shown in FIG. 6 is provided with a vehicle navigation system 18A in place of the vehicle navigation system 18 of the operation assist apparatus 1, a vehicle operation assist system 22A in place of the vehicle operation assist system 22 of the operation assist apparatus 1, and an ECU 30A in place of the ECU 30 of the operation assist apparatus 1. Further, the operation assist apparatus 1A is provided with a voice sensor 24. Other structures and components of the operation assist apparatus 1A are the same as those of the operation assist apparatus 1, and therefore their descriptions are omitted.

The vehicle navigation system 18A provides the ECU 30A with the vehicle navigation signals indicating the location of each stop point, the distance from the subject vehicle to each stop point, and route information. When no route guidance is being made, the vehicle navigation system 18A puts on the vehicle navigation signals the data containing the record of each stop line that the vehicle has passed, instead of the route information, and sends the vehicle navigation signals to the ECU 30A.

The voice sensor 24 detects the voice of the driver when he or she is speaking to other passenger or speaking on the phone. The voice sensor 24 provides the ECU 30A with "voice signals" indicating whether the driver is speaking.

The ECU 30A has a watching action detection period setting portion 33A in place of the watching action detection period setting portion 33 of the ECU 30. Further, the ECU 30A has a watching action delay time obtaining portion (watching action delay time obtaining device) 36. Other structures and components of the ECU 30A are the same as those of the ECU 30, and therefore their descriptions are omitted.

The watching action delay time obtaining portion 36 calculates the delay time of a watching action of the driver based on external conditions surrounding the vehicle and the state of the driver. Among various external conditions surrounding a vehicle, the conditions that may cause a delay of a watching action of the driver are, for example, whether the preceding vehicle stops at the stop point, the traveling direction of the vehicle, and the ratio between the width of the road on which the vehicle is traveling and the width of an intersecting road. Among various conditions related to the state of a driver, the condition that may cause a delay of a watching action of the driver is, for example, whether the driver is speaking. In the second exemplary embodiment, the watching action delay time obtaining portion 36 calculates the delay time of a watching action based on the external conditions surrounding the subject vehicle and the state of the driver as follows.

(a) Method for calculating a watching action delay time by factoring in whether the preceding vehicle stops at a stop point:

The watching action delay time obtaining portion 36 calculates a delay time T×1 when the preceding vehicle has passed through an intersection with a stop point without stopping at the stop point. More specifically, the watching action delay time obtaining portion 36 receives the radar signals from the radar sensor 10 and the vehicle navigation signals from the vehicle navigation system 18A. The watching action delay time obtaining portion 36 obtains the distance between the subject vehicle and other vehicle and the speed of the other vehicle, which are indicated by the radar signals, and determines the deceleration of the other vehicle from the distance between the subject vehicle and the other vehicle at a certain time interval and the speed of the other vehicle. Also, the watching action delay time obtaining portion 36 obtains the position of the stop line and the position of the intersection from the vehicle navigation signals.

Figure 7:
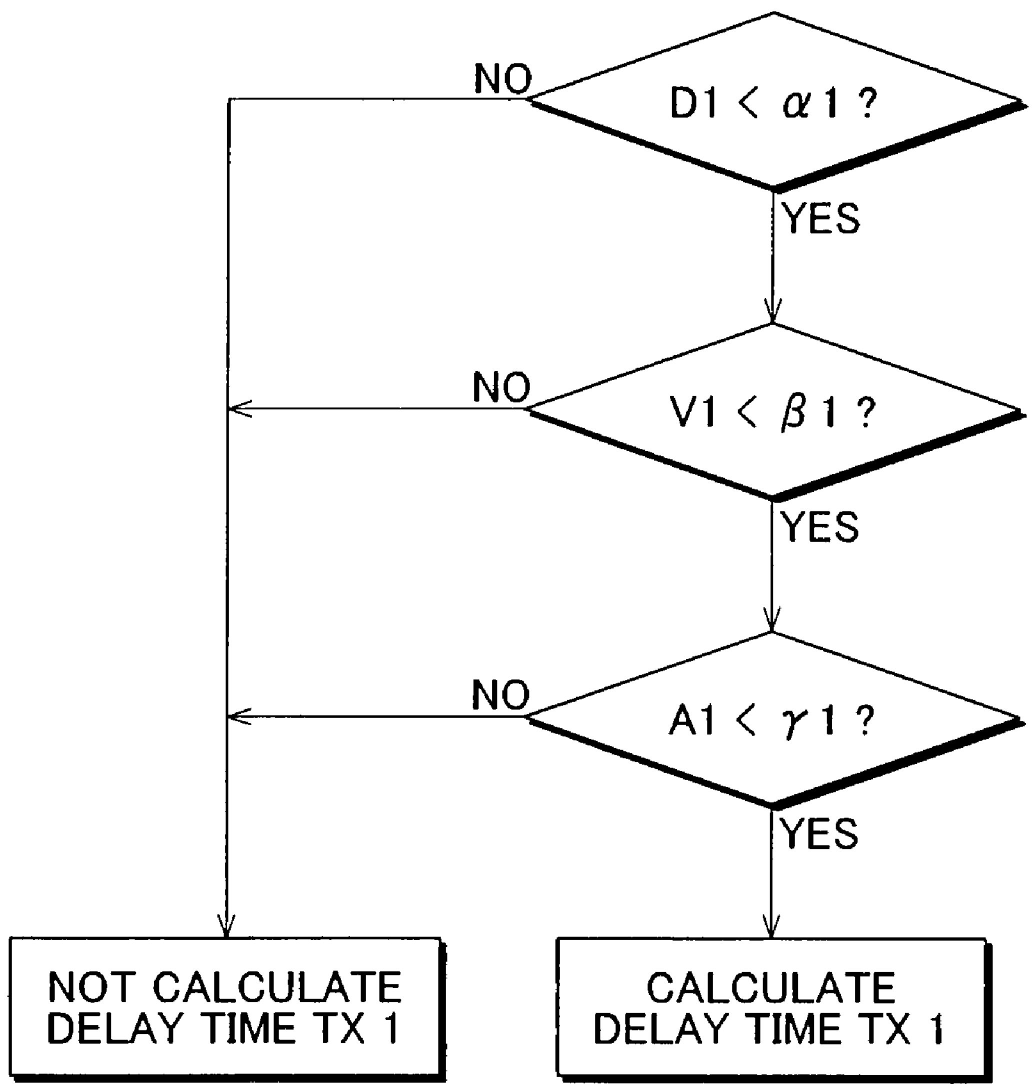
FIG. 7 is a flowchart illustrating a procedure that the watching action delay time obtaining portion executes to calculate the delay time of a watching action of the driver.

In the second exemplary embodiment, the watching action delay time obtaining portion 36 detects a speed V1 and a deceleration A1 of the vehicle preceding the subject vehicle and a distance D1 between the subject vehicle and the preceding vehicle when the preceding vehicle is in the range from the point 50 meters before the center of the intersection to the point 10 meters after the center of the stop line at the intersection. FIG. 7 is a flowchart illustrating a procedure that the watching action delay time obtaining portion executes to calculate the delay time of a watching action of the driver. As indicated in FIG. 7, the watching action delay time obtaining portion 36 calculates the delay time T×1 by the flowing expression (2) when the following conditions (i), (ii), (iii) are all in effect. That is, if any one of the three conditions is not in effect, the delay time T×1 is not calculated.

(i) $D1<\alpha 1$ ($\alpha 1$ is a constant, e.g., 50 m)

(ii) $V1>\beta 1$ ($\beta 1$ is a constant, e.g., 10 km/h)

(iii) $A1>\gamma 1$ ($\gamma 1$ is a negative constant, e.g., 1 m/s$^2$)

$$T\times 1=m1\times(\alpha 1-D1)/\alpha 1\times l1\times(V1-\beta 1)/\beta 1+n1\times(A2-\gamma 1)/\gamma 1 \quad (2)$$

In the expression (2) above, m1, l1, and n1 are arbitral factors.

(b) Method for calculating the delay time by factoring in the traveling direction of the subject vehicle:

The watching action delay time obtaining portion 36 sets a delay time T×2 when the subject vehicle is going to pass straight through the intersection. More specifically, when the vehicle navigation system 18A is performing route guidance, if the guided route, which is obtained from the vehicle navigation signals, goes straight through the intersection, the watching action delay time obtaining portion 36 sets the delay time T×2. On the other hand, if the guided route goes left or right at the intersection, the watching action delay time obtaining portion 36 does not set the delay time T×2. In the second exemplary embodiment, the delay time T×2 is 1 second.

Meanwhile, when the vehicle navigation system 18A is not performing any route guidance, the watching action delay time obtaining portion 36 obtains passage number N2, which represents the number of times the vehicle has passed through the intersection, from the past passage record indicated by the vehicle navigation signals, and the watching action delay time obtaining portion 36 then determines a percentage P2, which is the percentage of the number of times the vehicle having passed straight through the intersection to the obtained passage number N2, and sets the delay time T×2 if the following conditions (iv) and (v) are both in effect. That is, if either of the conditions (iv) and (v) is not in effect, the delay time T×2 is not set.

(iv) N2>α2 (α2 is a constant, e.g., 10 times)

(ii) P2>β2 (β2 is a constant, e.g., 0.8)

Note that the watching action delay time obtaining portion 36 may increase the accuracy in calculating the percentage P2 by using dates and times as parameters.

(c) Method for calculating a watching action delay time by factoring in the ratio between the width of the road on which the subject vehicle is traveling and the width of the intersecting road:

The watching action delay time obtaining portion 36 sets a delay time T×3 if the width of the intersecting road is narrower than the width of the road on which the vehicle is presently traveling (will be referred to as "present road"). More specifically, the watching action delay time obtaining portion 36 obtains a road width W1 of the present road and a road width W2 of the intersecting road from the route information carried by the vehicle navigation signals and calculates the value of a road width ratio W2/W1. Then, the watching action delay time obtaining portion 36 calculates the delay time T×3 using the following expression (3) if the following condition (vi) is in effect. That is, the delay T×3 is not calculated if the condition (vi) is not in effect.

(vi) W2/W1<α3 (α3 is a constant, e.g., 0.7)

$$Tx3 = m3 \times (\alpha 3 - W2/W1) \quad (3)$$

In the above expression, m3 is an arbitral factor.

(d) Method for calculating a watching action delay time by factoring in whether the driver is speaking When the driver is speaking to other passenger or speaking on the phone, the watching action delay time obtaining portion 36 sets a delay time T×4. More specifically, the watching action delay time obtaining portion 36 receives the voice signals from the voice sensor 24. After the beginning of a deceleration operation indicated by the brake signals, if the voice signals are indicating that the driver is speaking, the watching action delay time obtaining portion 36 sets the delay time T×4. In the second exemplary embodiment, the delay time T×4 is 1 second. If the voice signals are not indicating that the driver is speaking, the watching action delay time obtaining portion 36 does not set the delay time T×4. The watching action delay time obtaining portion 36 may set the delay time T×4 when detecting electric waves of the driver's cellar phone indicating conversation on the cellar phone or indicating the ringing of the cellar phone, as well as when detecting the driver's voice as mentioned above.

Then, the watching action delay time obtaining portion 36 calculates the total sum of the delay times T×1 to T×4 and sets the calculated total sum as a delay time T.

The watching action detection period setting portion 33A corrects the watching action detection period according to the delay time T that has been calculated as describe above. More specifically, the watching action detection period setting portion 33A retards the end −Ta of the watching action detection period by the delay time T (−Ta+T).

Then, the vehicle operation assist system 22A varies the assist deceleration threshold for the second stop assist according to the delay time T of watching action of the driver that has been calculated by the watching action delay time obtaining portion 36 as described above. More specifically, at this time, the vehicle operation assist system 22A sets an assist deceleration threshold G4 by the following expression (4) using the calculated delay time T of watching action of the driver and the predetermined deceleration G2.

$$G4 = G2 - m5 \times T \quad (4)$$

In the above expression, m5 is an arbitrary factor.

The vehicle operation assist system 22A calculates the distance needed to stop the subject vehicle from the present speed of the subject vehicle that is indicated by the speed signals and the assist deceleration threshold G4. The vehicle operation assist system 22A then executes the second stop assist using the assist deceleration threshold G4 at the moment the calculated stop distance exceeds the distance from the subject vehicle to the stop line, which is indicated by the vehicle navigation signals.

Because the assist deceleration threshold G4 is smaller than the predetermined deceleration G2 as evident from the expression (4), the vehicle operation assist system 22A starts to brake the subject vehicle in the second stop assist earlier than the vehicle operation assist system 22 starts to brake the subject vehicle in the second stop assist.

Figure 8:
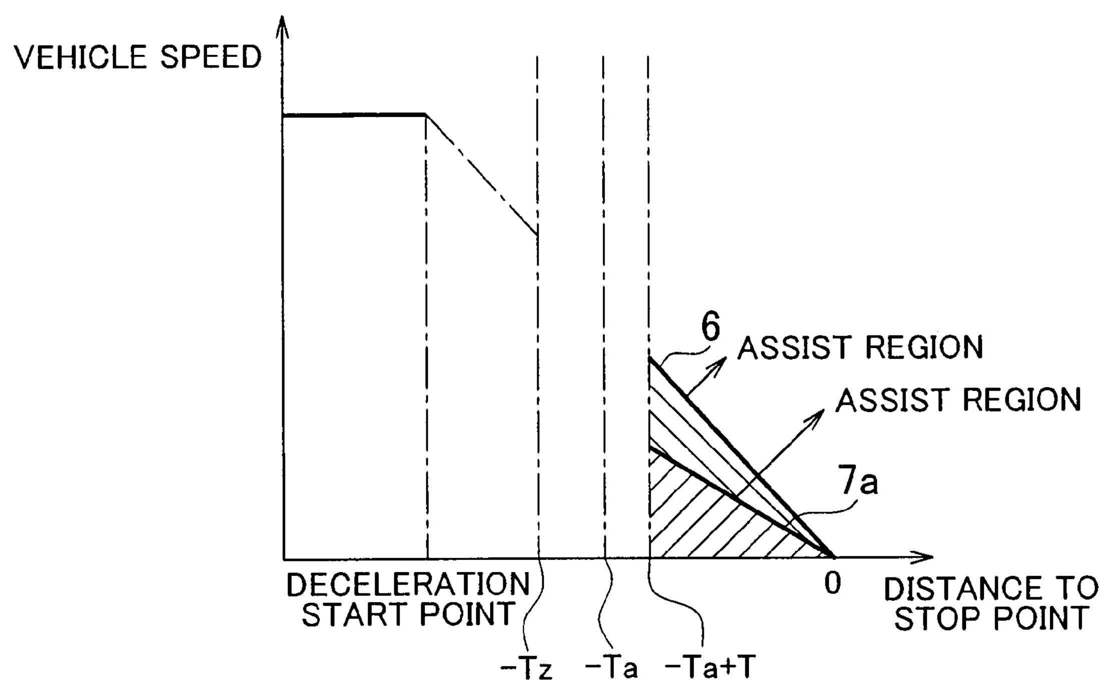
FIG. 8 is a chart illustrating the principal of the stop assist by the vehicle operation assist system of the second exemplary embodiment.

FIG. 8 is a chart illustrating the principal of the stop assist by the operation assist apparatus 1A of the second exemplary embodiment. As shown in FIG. 8, the watching action detection period is extended to −Tz to (−Ta+T). The assist deceleration threshold for the second stop assist that is indicated by the line 7*a* is changed by the above expression (6) according to the delay time T. The assist deceleration threshold for the first stop assist that is indicated by the line 6 is the same as that in the first exemplary embodiment. Thus, when the driver has taken a watching action during the watching action detection period, the first stop assist is executed in the same manner as it is in the first exemplary embodiment. On the other hand, when the driver has not taken a watching action during the watching action detection period, the second stop assist is executed using an assist deceleration threshold corresponding to the assist deceleration threshold G4, which is varied according to the delay time T of watching action of the driver, and at an earlier time than the time the first stop assist is executed.

The operation assist apparatus 1A of the second exemplary embodiment provides the same advantages as those provided by the operation assist apparatus 1 of the first exemplary embodiment. Further, according to the operation assist apparatus 1A, the end of the watching action detection period is changed by the watching action delay time obtaining portion 36 calculating the delay time T of watching action of the driver based on the external conditions surrounding the subject vehicle and the state of the driver and by the watching action detection period setting portion 33A extending the watching action detection period according to the calculated delay time T. Therefore, even if a watching action of the driver is delayed, the watching action can be accurately detected, and this increases the accuracy in determining whether the driver will stop the vehicle at the stop point.

Further, according to the operation assist apparatus 1A of second exemplary embodiment, because the vehicle operation assist system 22A varies the assist deceleration threshold G4 for the second stop assist according to the delay time T of watching action of the driver, the second stop assist can be activated at an earlier stage. As such, the operation assist apparatus 1A of the second exemplary embodiment can assist the driver in a safer manner when he or she has overlooked the stop line.

FIG. 9 shows the configuration of an operation assist apparatus according to the third exemplary embodiment of the invention. The operation assist apparatus 1B shown in FIG. 9 is provided with a vehicle navigation system 18B in place of the vehicle navigation system 18 of the operation assist apparatus 1, a sightline detection device 20B in place of the sightline detection device 20 of the operation assist apparatus 1, an ECU 30B in place of the ECU 30 of the operation assist apparatus 1, and a vehicle operation assist system 22B in place of the vehicle operation assist system 22 of the operation assist apparatus 1. Other structures and components of the operation assist apparatus 1B are the same as those of the operation assist apparatus 1, and therefore their descriptions are omitted.

The vehicle navigation system 18B keeps the drive record of the subject vehicle which includes the vehicle passage record for the stop lines that the vehicle has passed through in the last one month. In the third exemplary embodiment, the vehicle passage record is comprised of a vehicle passage number Ta, a vehicle passage time interval Tb, and a route change number Tc. The vehicle navigation system 18B provides the ECU 30B with the vehicle navigation signals indicating the vehicle passage number Ta, the vehicle passage time interval Tb, and the route change number Tc. The route change number Tc stands for the number of times the driver did not follow the route guidance of the vehicle navigation system 18B during the time period from the when the engine of the subject vehicle was started to when the subject vehicle came to each stop point and during the time period from when the subject vehicle passed through an exit of a highway to when the vehicle came to each stop point.

Also, the vehicle navigation system 18B stores, in its database, the information regarding the positions of the gravity centers and the sizes of objects near an intersection with a stop point, such as signboards, and the vehicle navigation system 18B provides the sightline detection device 20B with the information regarding the gravity center positions and the sizes of the objects.

The sightline detection device 20B determines whether the drivers has watched a watch object other than the stop line but related to the stop point in accordance with whether the direction to the watch object and the direction of the driver's sightline coincide with each other, as well as determining whether the driver has watched the stop line as mentioned above. More specifically, at this time, the sightline detection device 20B receives the watch object information from the ECU 30B. The sightline detection device 20B makes the determination as to whether the direction to the watch object and the direction of the driver's sightline coincide with each other based on the watch object information and the position of the gravity center of the watch object. The sightline detection device 20B then provides the ECU 30B with the watching action signals indicating whether the driver has watched the stop line and whether the driver has watched the watch object.

The ECU 30B has a watching action detection period setting portion 33B in place of the watching action detection period setting portion 33 of the ECU 30. The ECU 30B also has a vehicle passage record determination portion 37 and a watch object learning portion (watch object learning device) 38. Other structures and components of the ECU 30B are the same as those of the ECU 30, and therefore their descriptions are omitted.

The vehicle passage record determination portion 37 determines whether the subject vehicle has passed through a stop line. More specifically, the vehicle passage record determination portion 37 calculates a vehicle passage frequency Φ, which is the frequency at which the subject vehicle has passed through a specific stop line, and determines whether the calculated passage frequency Φ is higher than a predetermined value. In the third exemplary embodiment, the vehicle passage record determination portion 37 receives the vehicle navigation signals from the vehicle navigation system 18B, and the vehicle passage record determination portion 37 calculates the vehicle passage frequency Φ by the following expression (5) using the vehicle passage number Ta, the vehicle passage time interval Tb, and the route change number Tc, which are indicated by the vehicle navigation signals.

$$\Phi=\alpha5\times Ta+\beta5/Tb+\gamma5\times Tc \quad (5)$$

In the above expression, α5, β5, γ5 are weighting factors. The values of α5, β5, γ5 are set according to the priority order among them such that $\alpha5>\beta5>\gamma5$. When the vehicle passage frequency Φ is high, it indicates that the vehicle has passed the stop line at a high frequency.

If the vehicle passage record determination portion 37 determines that the subject vehicle has ever passed through the stop line, the watching action detection period setting portion 33B then sets the watching action detection period −Tz to −Ta in the manner described above. On the other hand, if the vehicle passage record determination portion 37 determines that the subject vehicle has never passed through the stop line, the watching action detection period setting portion 33B identifies the stop line as an unknown stop line and then shortens the watching action detection period that has been set before. In the third exemplary embodiment, at this time, the watching action detection period setting portion 33B changes the end of the watching action detection period so as to shorten the same period by two seconds.

If the vehicle passage record determination portion 37 determines that the vehicle has ever passed through the stop line, the watch object learning portion 38 learns, as an watch object, an object other than road signs associated with the stop point (e.g., stop lines). In the third exemplary embodiment, the objects that are learned as the watch object are detected by the sightline detection device 20B. In the following, a description will be made of how the sightline detection device 20B detects such objects other than road signs.

The sightline detection device 20B, at each stop point, detects whether the direction to an object near an intersection with a stop point and the direction of the driver's sightline coincide with each other. More specifically, the sightline detection device 20B receives the vehicle navigation signals from the vehicle navigation system 18B at each stop point. The sightline detection device 20B detects objects within the view area of the driver from the information regarding the positions of the gravity centers and the sizes of a plurality of objects, which information is carried by the vehicle navigation signals. The sightline detection device 20B determines, during the watching action detection period, whether the direction to each object and the direction of the driver's sightline are coinciding with each other.

Figure 10:
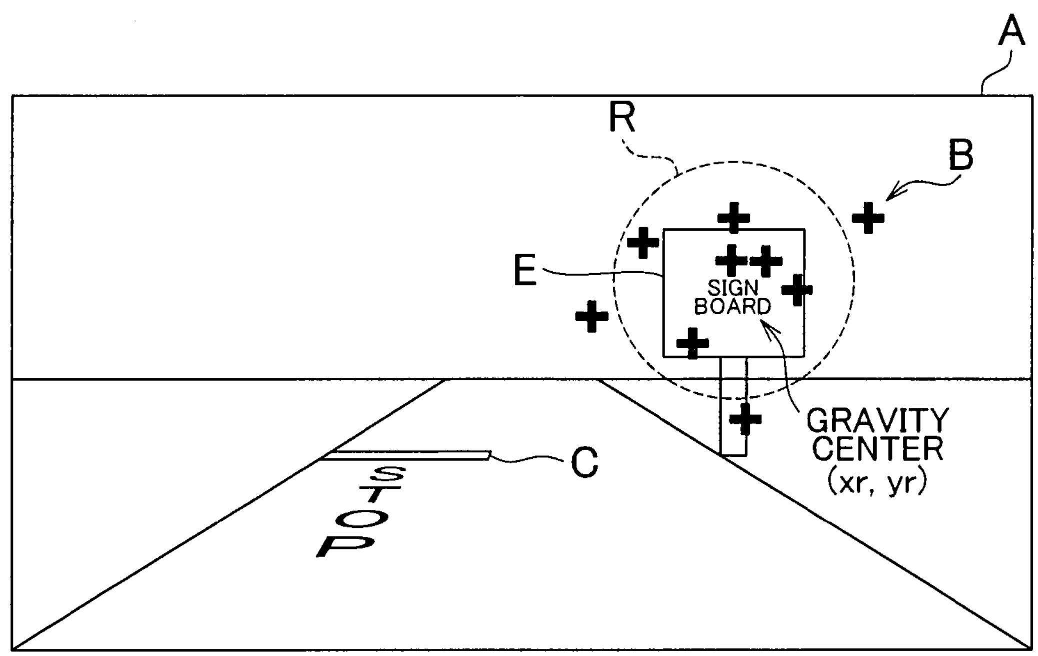
FIG. 10 is a chart illustrating the principal of the watching action detection by the sightline detection device.

FIG. 10 illustrates the principal of the watching action detection by the sightline detection device. In FIG. 10, the marks B indicating the direction of the driver's sightline are plotted on the view area image A at given time intervals. A signboard E, which is an object, is shown in the view area image A. In the third exemplary embodiment, if the ratio of the number of the marks B in a watching recognition radius R from the gravity center of the sign board E (xr, yr) is equal to or higher than a predetermined ratio, the sightline detection device 20B determines that the direction to the object (sign board E) and the direction of the driver's sightline are coinciding with each other. The sightline detection device 20B provides the watch object learning portion 38 of the ECU 30B with the watching action signals indicating whether the driver has watched the object and carrying the information regarding the object.

The watch object learning portion 38 receives the watching action signals from the sightline detection device 20B and the vehicle navigation signals from the vehicle navigation system 18B at each stop point. If the object indicated by the watching action signals is located before an intersection with a stop point that is present within an conical watching area connecting the position of the driver and the position of the gravity center of the object, which are indicated by the vehicle navigation signals, the watch object learning portion 38 determines whether the driver watched that object during the watching action detection period. At this time, if it is determined that the driver watched the object during the watching action detection period, the watch object learning portion 38 increments the count indicating the number of times the driver has watched the object. If the counted number is equal to or larger than a predetermined value, the watch object learning portion 38 sets the object as a watch object and provides the sightline detection device 20B with the information regarding this watch object. This is how the sightline detection device 20 detects watching actions of the driver for watch objects. On the other hand, if it is determined that the vehicle has never passed through the stop line, no watch object is set.

The vehicle operation assist system 22B varies the assist deceleration threshold used for the second stop assist in accordance with the vehicle passage frequency Φ. More specifically, the vehicle operation assist system 22B obtains the vehicle passage frequency Φ from the ECU 30, which has been calculated by the ECU 30, and calculates an assist deceleration threshold G5 by the expression (6) using the vehicle passage frequency Φ and 0.4 G.

$$G5=0.4\ G-\tau/\xi/\eta \tag{6}$$

In the above expression, τ is an arbitral factor, ξ represents the number of times the driver has watched an object at a stop point, and η represents the number of times the vehicle has stopped at the stop point. The values of τ, ξ, and η are set such that $0.2\ G \leqq \tau/\xi/\eta \leqq 0.4G$.

The vehicle operation assist system 22B calculates the distance needed to stop the subject vehicle from the present speed of the subject vehicle indicated by the speed signals and the assist deceleration threshold G5. The vehicle operation assist system 22B executes the second stop assist with the assist deceleration threshold G5 at the moment the calculated stop distance exceeds the distance from the subject vehicle to the stop line, which is indicated by the vehicle navigation signals.

Because the vehicle operation assist system 22B reduces the assist deceleration threshold G5 according to the learning level as evident from the expression (6), the vehicle operation assist system 22B starts to brake the vehicle in the second stop assist earlier than the vehicle operation assist system 22 starts to brake the vehicle in the second stop assist.

Next, the operation of the operation assist apparatus 1B will be described. First, the above-described processes 1 and 2 are performed.

Then, the process 2*a* is performed as follows. The vehicle passage record determination portion 37 determines whether the subject vehicle has passed through the stop line. More specifically, at this time, the vehicle passage record determination portion 37 calculates the vehicle passage frequency Φ by the expression (5) using the vehicle passage number Ta, the vehicle passage time interval Tb, and the route change number Tc, and determines whether the calculated vehicle passage frequency Φ is higher than a predetermined value.

Subsequently, the foregoing processes 3 and 4 are performed. After the processes 3 and 4, if the vehicle passage record determination portion 37 determines that the subject vehicle has ever passed through the stop line, the control then proceeds to the process 5*a*, which will be described later. On the other hand, if the vehicle passage record determination portion 37 determines that the vehicle has never passed through the stop line, the control then proceeds to the process 5*b*, which will be described later.

Next, the process 5*a* will be described. In this process, if the vehicle passage record determination portion 37 determines that the vehicle has ever passed through the stop line, the watching action detection period setting portion 33B sets the watching action detection period −Tz to −Ta, as in the process 5 described above, and the watch object learning portion 38 learns watch objects other than the stop line. More specifically, at this time, if the number of times the driver has watched an object other than the stop line is equal to or larger than a predetermined value, the object is set as a watch object, and the information regarding the watch object is provided to the sightline detection device 20B. Then, from this information, the sightline detection device 20B detects whether the driver has watched the stop line and whether the driver has watched the watch object.

Then, based on the result of this detection, the sightline detection device 20B determines whether the driver watched the stop line or the watch object during the watching action detection period −Tz to −Ta, and then outputs the control signals corresponding to the result of this determination. More specifically, at this time, if the watching action signals indicate a watching action of the driver during the watching action detection period −Tz to −Ta, the control signals requiring the first assist are output, and the process 6 described above is then performed.

On the other hand, if the watching action signals does not indicate any watching action during the watching action detection period −Tz to −Ta, the control signals requiring the second assist are output, and the process 7*a* described above is then performed.

Next, the process 7*a* will be described. If the control signals requiring the second stop assist have been output from the assist control portion 34, the vehicle operation assist system 22B varies the assist deceleration threshold in accordance with the vehicle passage frequency Φ. More specifically, at this time, the assist deceleration threshold G5 is calculated by the expression (6) using the vehicle passage frequency Φ and the predetermined deceleration 0.4 G. Then, the distance needed to stop the vehicle is calculated from the assist deceleration threshold G5 calculated as above and the present speed of the subject vehicle. Subsequently, the subject vehicle is automatically braked at the assist deceleration threshold G5 from the moment the calculated stop distance exceeds the distance from the vehicle to the stop line.

Figure 11A:
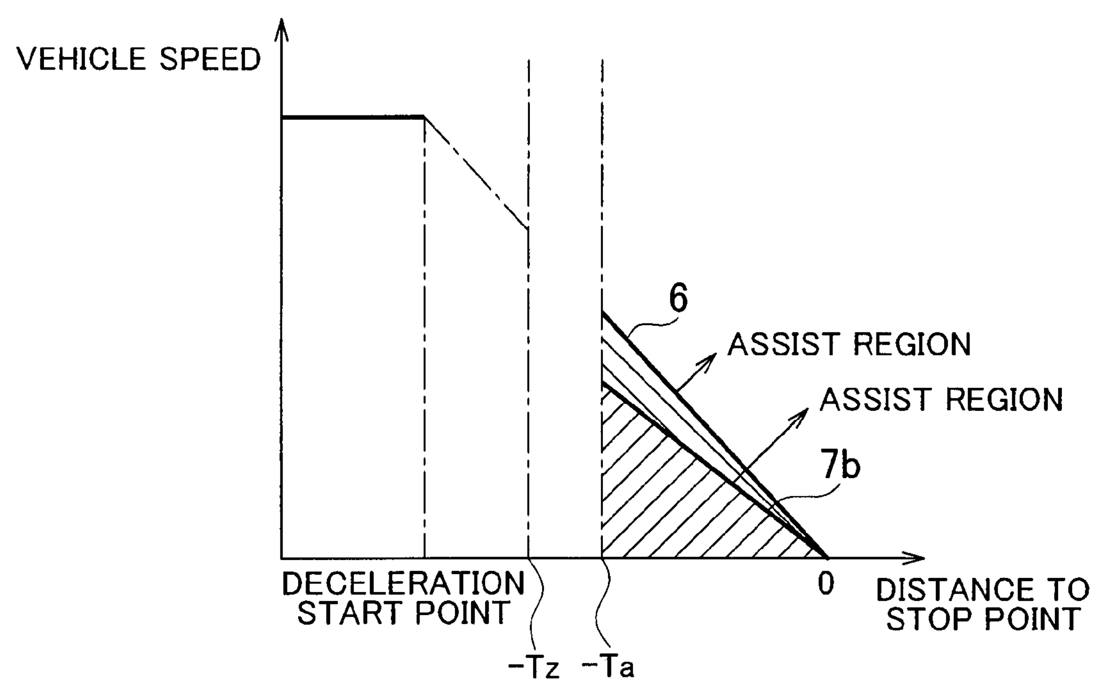
FIG. 11A and FIG. 11B are charts illustrating the principal of the stop assist by the vehicle operation assist system of the third exemplary embodiment.
Figure 11B:
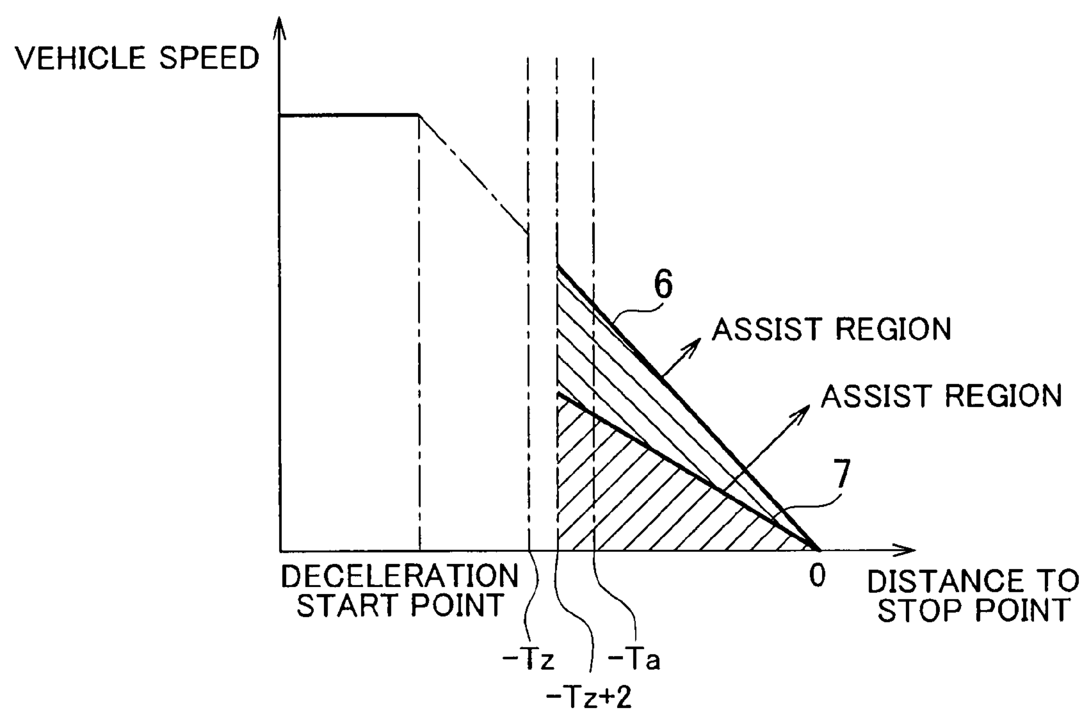

FIG. 11A and FIG. 11B are charts illustrating the principal of the stop assist by the vehicle operation assist system of the third exemplary embodiment. FIG. 11A illustrates the principals of the first assist and the second assist that are executed by the vehicle operation assist system 22B of the third exemplary embodiment when the subject vehicle is about to pass through a stop line that the vehicle has ever passed through. On the other hand, FIG. 11B illustrates the principals of the first assist and the second assist that are executed by the vehicle operation assist system 22B of the third exemplary embodiment when the subject vehicle is about to pass through a stop line that the subject vehicle has never passed through.

The assist deceleration threshold for the second stop assist, which is indicated by the line 7*b* in FIG. 11A, is varied within the range from 0.4 G to 0.2 G using the expression (6) in accordance with the learning level if the subject vehicle has ever passed the stop line and the driver did not watch the stop line during the watching action detection period. That is, if the vehicle has ever passed through the stop line and the driver watched the stop line during the watching action detection period, the first stop assist is executed in the same manner as it is in the first exemplary embodiment described above. On the other hand, if the vehicle has never passed through the stop line and the driver did not watch the stop line during the watching action detection period, the second stop assist is executed using an assist deceleration threshold corresponding to the assist deceleration threshold G5, which is varied in accordance with the learning level, and at an earlier time than the time the first assist is executed. FIG. 11B will be described later.

Next, the process 5*b* will be described. When the vehicle passage record determination portion 37 determines that the subject vehicle has never passed the stop line, the likelihood for the driver to overlook the stop line is relatively high, and therefore the watching action detection period setting portion 33B shortens the watching action detection period to the time period −Tz to (−Tz+2) by changing the end of the watching action detection period.

Then, the assist control portion 34 determines, based on the result of the detection by the sightline detection device 20B, whether the driver watched the stop line during the watching action detection period −Tz to (−Tz+2), and then outputs the control signals corresponding to the result of this determination. More specifically, at this time, if the watching action signals from the sightline detection device 20 indicate that the driver watched the stop line during the watching action detection period −Tz to (−Tz+2), the control signals requiring the first stop assist are output, and then a process corresponding to the process 6 described above is performed.

On the other hand, if the watching action signals from the sightline detection device 20 indicate that the driver did not watch the stop line during the watching action detection period −Tz to (−Tz+2), the control signals requiring the second stop assist are output, and then a process corresponding to the process 7 described above is performed.

Meanwhile, referring to FIG. 11B, if the subject vehicle has never passed through the stop line, the watching action detection period is shortened to the time period −Tz to (−Tz+2) so that the assist region extends. The assist deceleration threshold for the first stop assist that is indicated by the line 6 and the assist deceleration threshold for the second stop assist that is indicated by the line 7 are the same as those in the first exemplary embodiment.

Therefore, if the subject vehicle has never passed through the stop line and the driver watched the stop line during the watching action detection period, the first stop assist is executed using an assist deceleration threshold corresponding to the predetermined deceleration G1 (0.4 G) immediately before the distance needed to stop the subject vehicle exceeds the distance from the subject vehicle to the stop line. On the other hand, if the vehicle has never passed through the stop line and the driver did not watch the stop line during the watching action detection period, the second stop assist is then executed using an assist deceleration threshold corresponding to the predetermined deceleration G2 (0.2 G) at an earlier time than the time the first stop assist is executed.

When a vehicle is passing through a known intersection with a stop point, the driver of the vehicle often stops the vehicle by referring to, as a stop point indicator, an object other than road signs associated with the stop point (e.g., stop lines).

According to the operation assist apparatus 1B, the watch object learning portion 38 learns a watch object other than road signs, and the sightline detection device detects the driver's action for watching this watch object as an action for watching the stop point of the intersection, as well as the driver's action for watching the stop line. As such, whether the driver has perceived the stop line can be accurately detected, and whether the driver will stop the subject vehicle at the stop line can be accurately determined.

Further, according to the operation assist apparatus 1B of the third exemplary embodiment, when the stop vehicle is passing through an unknown intersection with a stop point, the watching action detection period setting portion 33B shortens the watching action detection period so that the assist region extends. On the other hand, when the stop vehicle is passing through a known intersection with a stop point, the vehicle operation assist system 22B reduces the assist deceleration threshold G5 for the second stop assist in accordance with the learning level, that is, the vehicle passage frequency Φ for the stop line at the intersection. Therefore, the second stop assist can be executed at an earlier stage, so that the assist region extends. As such, the vehicle operation assist can be performed in a safer manner when the driver has failed to notice the stop point at an intersection.

The invention is not limited to the exemplary embodiments described above, but it may be modified in various forms.

In the foregoing exemplary embodiments, the end of the watching action detection period may be changed in accordance with the habit of the driver. For example, the ECU may be further provided with a watching timing learning portion (watching timing learning device). In this case, the watching timing learning portion learns the timings of watching actions of the driver, and the watching action detection period setting portion corrects the watching action detection period in accordance with the leaned watching action timings.

More specifically, the watching timing learning portion keeps a record of the timing at which the driver's watching action was detected with respect to the deceleration start timing, and the watching timing learning portion calculates an average of the detection timings in the record. Then, the watching timing learning portion changes the end of the watching action detection period in accordance with the calculated average of the detection timings.

In the foregoing exemplary embodiments, the deceleration operation detection range may be changed in accordance with the habit of the driver. For example, the ECU keeps a record of the distance from each stop point to the point at which the driver started to decelerate the subject vehicle to stop it at the stop point, and the deceleration operation detection range is changed in accordance with the average of the deceleration start distances in the record.

Further, in the foregoing exemplary embodiments, the stop assist is implemented by the automatic braking by the vehicle operation assist system. Alternatively, an indicator device, such as a display or a speaker, may be provided in place of the vehicle operation assist system, and the stop assist may be achieved by the indicator device indicating a danger to the driver. Also, the vehicle operation assist system of each exemplary embodiment of the invention and the indicator device may both be provided and used to implement the stop assist by the indication by the indicator device and the automatic braking by the vehicle operation assist system.

Further, in the foregoing exemplary embodiments, a fourth stop assist may be executed when detecting a situation where it is difficult for the driver to find a stop sign (stop line or an object indicating a stop point) and thus the driver is likely to brake the vehicle belatedly, such as when there is a curve just before the stop point, when there is an uphill slope just before the stop point, when the subject vehicle is traveling at night, and when there is an obstacle. For example, the fourth stop assist may be executed as described below.

First, the ECU detects, from the road information obtained from the vehicle navigation system, that the distance from the subject vehicle to the stop point is equal to a predetermined distance. Then, the CCD camera captures an image of the view ahead of the subject vehicle, and the ECU processes the captured image so as to detect whether there is any stop sign. If a stop sign is detected, the operation assist apparatus executes a selected one of the first to third stop assists described above. On the other hand, if no stop sign is detected, the operation assist apparatus determines that a stop sign or stop signs are obscured and then performs the fourth stop assist. In the fourth stop assist, for example, it is notified to the driver by means of voice message, sound, or GUI (Graphic User Interface) that the subject vehicle is approaching the stop point. This notification is started at a point a predetermined distance before the stop point. According to this modification example, owing to the fourth stop assist, the vehicle operation assist can be perfumed in a safer manner.

The invention claimed is:

1. An operation assist apparatus, comprising:

an assist controller that assists a driver of a vehicle in operating the vehicle before a stop point;

a watching action detector configured to detect a watching action of the driver to determine if the driver is watching the stop point; and a deceleration operation detector configured to detect a deceleration operation by the driver, wherein the assist controller changes an assist manner that assists the vehicle operation by the driver based on both of whether the watching action detector has determined that the driver is watching the stop point and whether the deceleration operation detector has detected a deceleration operation by the driver.

2. The operation assist apparatus according to claim 1, wherein the assist controller changes the assist manner so as to advance the timing to start assisting the vehicle operation by the driver if the watching action was not detected during deceleration of the vehicle.

3. The operation assist apparatus according to claim 2, further comprising:

a sightline direction detector that detects the direction of the driver's sightline; and an indicator position detector that detects the position of an indicator associated with the stop point, wherein the watching action detector detects the watching action of the driver based on the direction of the driver's sightline that has been detected by the sightline direction detector and the position of the indicator that has been detected by the indicator position detector.

4. The operation assist apparatus according to claim 2, further comprising:

a stop point position detector that detects the position of a stop point that is present ahead of the vehicle in the traveling direction of the vehicle; and a setting device that, when a stop point position has been detected by the stop point position detector and a deceleration operation by the driver has been detected by the deceleration operation detector, sets a watching action detection period during which to detect a watching action of the driver, based on the time the deceleration operation was started, wherein the assist controller changes the assist manner in accordance with whether a watching action was detected during the watching action detection period set by the setting device.

5. The operation assist apparatus according to claim 4, wherein the setting device estimates a time needed to stop the vehicle and factors in the estimated time when setting the watching action detection period.

6. The operation assist apparatus according to claim 5, further comprising:

a watching timing learning device that learns a timing at which the driver takes a watching action, wherein the setting device corrects the watching action detection period in accordance with the timing learned by the watching timing learning device.

7. The operation assist apparatus according to claim 5, further comprising:

a delay time obtaining device that obtains a delay time of a watching action based on external conditions surrounding the vehicle and a state of the driver, wherein the setting device corrects the watching action detection period in accordance with the delay time obtained by the delay time obtaining device.

8. The operation assist apparatus according to claim 1, further comprising:

a recording device that keeps a vehicle passage record for each stop point;

a watch object learning device that, when the vehicle is about to pass through a stop point that is recorded in the recording device as the stop point that the vehicle has ever passed through, learns a watch object other than a road sign associated with the stop point, wherein the watching action detector detects a watching action of the driver for watching the watch object learned by the watch object learning device and identifies the detected watching action as a watching action for watching the stop point.

9. The operation assist apparatus according to claim 1, wherein the assist controller assists the vehicle operation by the driver by automatically adjusting the braking force to be applied to the vehicle.

10. The operation assist apparatus according to claim 1, further comprising:

a sightline direction detector that detects the direction of the driver's sightline; and an indicator position detector that detects the position of an indicator associated with the stop point, wherein the watching action detector detects the watching action of the driver based on the direction of the driver's sightline that has been detected by the sightline direction detector and the position of the indicator that has been detected by the indicator position detector.

11. The operation assist apparatus according to claim 10, further comprising:

a stop point position detector that detects the position of a stop point that is present ahead of the vehicle in the traveling direction of the vehicle;

a deceleration operation detector that detects a deceleration operation by the driver; and a setting device that, when a stop point position has been detected by the stop point position detector and a deceleration operation by the driver has been detected by the deceleration operation detector, sets a watching action detection period during which to detect a watching action of the driver, based on the time the deceleration operation was started, wherein the assist controller changes the assist manner in accordance with whether a watching action was detected during the watching action detection period set by the setting device.

12. The operation assist apparatus according to claim 11, wherein the setting device estimates a time needed to stop the vehicle and factors in the estimated time when setting the watching action detection period.

13. The operation assist apparatus according to claim 12, further comprising:

a watching timing learning device that learns a timing at which the driver takes a watching action, wherein the setting device corrects the watching action detection period in accordance with the timing learned by the watching timing learning device.

14. The operation assist apparatus according to claim 12, further comprising:

a delay time obtaining device that obtains a delay time of a watching action based on external conditions surrounding the vehicle and a state of the driver, wherein the setting device corrects the watching action detection period in accordance with the delay time obtained by the delay time obtaining device.

15. The operation assist apparatus according to claim 1, further comprising:

a stop point position detector that detects the position of a stop point that is present ahead of the vehicle in the traveling direction of the vehicle;

a deceleration operation detector that detects a deceleration operation by the driver; and a setting device that, when a stop point position has been detected by the stop point position detector and a deceleration operation by the driver has been detected by the deceleration operation detector, sets a watching action detection period during which to detect a watching action of the driver, based on the time the deceleration operation was started, wherein the assist controller changes the assist manner in accordance with whether a watching action was detected during the watching action detection period set by the setting device.

16. The operation assist apparatus according to claim 15, wherein the setting device estimates a time needed to stop the vehicle and factors in the estimated time when setting the watching action detection period.

17. The operation assist apparatus according to claim 16, further comprising:

a watching timing learning device that learns a timing at which the driver takes a watching action, wherein the setting device corrects the watching action detection period in accordance with the timing learned by the watching timing learning device.

18. The operation assist apparatus according to claim 16, further comprising:

a delay time obtaining device that obtains a delay time of a watching action based on external conditions surrounding the vehicle and a state of the driver, wherein the setting device corrects the watching action detection period in accordance with the delay time obtained by the delay time obtaining device.

* * * * *